United States Patent
Pikul et al.

(10) Patent No.: US 12,334,532 B2
(45) Date of Patent: Jun. 17, 2025

(54) METAL AIR SCAVENGER—AN ENERGY HARVESTING TECHNOLOGY FOR POWERING ELECTRONICS AND ROBOTICS

(71) Applicant: THE TRUSTEES OF THE UNIVERSITY OF PENNSYLVANIA, Philadelphia, PA (US)

(72) Inventors: James Henry Pikul, Philadelphia, PA (US); Min Wang, Philadelphia, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 776 days.

(21) Appl. No.: 17/428,996

(22) PCT Filed: Feb. 12, 2020

(86) PCT No.: PCT/US2020/017952
§ 371 (c)(1),
(2) Date: Aug. 6, 2021

(87) PCT Pub. No.: WO2020/167965
PCT Pub. Date: Aug. 20, 2020

(65) Prior Publication Data
US 2022/0190409 A1    Jun. 16, 2022

Related U.S. Application Data

(60) Provisional application No. 62/804,345, filed on Feb. 12, 2019.

(51) Int. Cl.
*H01M 12/06* (2006.01)
*H01M 8/22* (2006.01)

(52) U.S. Cl.
CPC .......... *H01M 12/065* (2013.01); *H01M 8/22* (2013.01); *H01M 2250/20* (2013.01)

(58) Field of Classification Search
None
See application file for complete search history.

(56) References Cited

U.S. PATENT DOCUMENTS

| | | |
|---|---|---|
| 4,957,826 A | 9/1990 | Cheiky |
| 7,070,882 B1 | 7/2006 | Ferrando |
| (Continued) | | |

FOREIGN PATENT DOCUMENTS

| | | | |
|---|---|---|---|
| CH | 714884 A2 | * | 10/2019 |
| WO | 2017/138738 A1 | | 8/2017 |
| WO | 2019/014474 A1 | | 1/2019 |

OTHER PUBLICATIONS

Pikul J. et al., "Metal-Air Harvester", University of Pennsylvania, Publication online Oct. 16, 2019, retrieved from the internet on Apr. 3, 2020.

(Continued)

*Primary Examiner* — Lucas J. O'Donnell
(74) *Attorney, Agent, or Firm* — BakerHostetler

(57) ABSTRACT

Provided are metal-air scavenger systems that use metal surfaces to harvest energy for powering microelectronic devices; such devices can be attached to exposed metal surfaces and then generate power by electrochemically oxidizing the metal surface. The disclosed devices can be configured to effect relative motion between the device and the metal, thus allowing the device to utilize an entire metal surface to generate power and also allowing the device to feed metal to itself to generate power.

22 Claims, 14 Drawing Sheets

(56) References Cited

U.S. PATENT DOCUMENTS

| | | | |
|---|---|---|---|
| 7,157,171 | B2 | 1/2007 | Huang |
| 2010/0203397 | A1 | 8/2010 | Thiemann-Handler et al. |
| 2011/0195321 | A1 | 8/2011 | Takahashi et al. |
| 2011/0269030 | A1 | 11/2011 | Moore |
| 2014/0147755 | A1 | 5/2014 | Hirose et al. |
| 2015/0162622 | A1 | 6/2015 | Eychmueller et al. |
| 2017/0104228 | A1 | 4/2017 | Lee et al. |

OTHER PUBLICATIONS

"A312 Zinc-air button cell," retrieved at, https://www.celltech.dk/fileadmin/user_upload/Celltech/Products/PDF_FILES/1_4V_Zink/5013233-datasheet.pdf, retrieved on 2019.

"Lithium ion NCR18650B specifications," Panasonic, 2012, retrieved at http://go.nature.com/2b1p3SS, retrieved on Feb. 16, 2022, pp. 1.

"PP425Zinc Air Prismatic" retrieved at https://www.manualshelf.com/manual/energizer/pp425/battery-datasheet.html, retrieved on 2019, pp. 3.

Bai, Y., et al., "Energy Harvesting Research: The Road from Single Source to Multisource," Advanced Materials, Jun. 2018, vol. 30, Issue 34, pp. 1707271.

Chen, T., et al., "Harnessing bistability for directional propulsion of soft, untethered robots," Proceedings of the National Academy of Sciences, 2018, vol. 115, pp. 5698-5702.

Chen, Z., et al., "A Three-Dimensionally Interconnected Carbon Nanotube-Conducting Polymer Hydrogel Network for High-Performance Flexible Battery Electrodes," Advanced Energy Materials, 2014, vol. 4, Issue 12, pp. 1400207.

Churaman, W. A., et al., "The First Launch of an Autonomous Thrust-Driven Microrobot Using Nanoporous Energetic Silicon," Journal of Microelectromechanical Systems, 2011, vol. 21, Issue 1, pp. 198-205.

Fukushima, F., et al., "Development of tethered autonomous mobile robot systems for field works," 2001, vol. 15, pp. 481-496.

Hopkins, B. J., et al., "Suppressing corrosion in primary aluminum-air batteries via oil displacement," Science, 2018, vol. 362, Issue 6415, pp. 658-661.

Hu, R., et al., "Harvesting Waste Thermal Energy Using a Carbon-Nanotube-Based Thermo-Electrochemical Cell," Nano Letters, 2010, vol. 10, Issue 3, pp. 838-846.

Im, H., et al., "High-efficiency electrochemical thermal energy harvester using carbon nanotube aerogel sheet electrodes," Nature Communications, 2016, vol. 7, Issue 1, pp. 10600.

Jacques, E., et al., "Piezo-Electrochemical Energy Harvesting with Lithium-Intercalating Carbon Fibers," ACS Applied Materials & Interfaces, 2015, vol. 7, Issue 25, pp. 13898-13904.

Kazim, M., et al., "Theoretical Analysis on Energy Consumption for Industrial Robots," Applied Mechanics and Materials, vol. 699, 2015, pp. 846-852.

Kim, S., et al., "Electrochemically driven mechanical energy harvesting," Nature Communications, 2016, vol. 7, Issue 1, pp. 10146.

Konarov, A., et al., "Present and Future Perspective on Electrode Materials for Rechargeable Zinc-Ion Batteries," ACS Energy Letters, 2018, vol. 3, Issue 10, pp. 2620-2640.

Laschi, C., et al., "Soft robotics: Technologies and systems pushing the boundaries of robot abilities," Sci. Robot, Dec. 2016, vol. 1, eaah3690, pp. 1-12.

Li, Y., et al., "Advanced zinc-air batteries based on high-performance hybrid electrocatalysts," Nat Commun, 2013, vol. 4, Issue 1, pp. 1-7.

Li, Y., et al., "Metal-Air Batteries: Will They Be the Future Electrochemical Energy Storage Device of Choice?" ACS Energy Letters, 2017, vol. 2, Issue 6, pp. 1370-1377.

Li, Y., et al., "Recent advances in zinc-air batteries," Chem Soc Rev, 2014, vol. 43, Issue 15, pp. 5257-5275.

Liu, Y., et al., "A comprehensive review on recent progress in aluminum-air batteries," Green Energy & Environment, 2017, vol. 2, Issue 3, pp. 1-32.

Ma, H., et al., "Development and Characterization of an Electrically Rechargeable Zinc-Air Battery Stack," Energies, 2014, vol. 7, Issue 10, pp. 6549-6557.

Ma, L., et al., "Single-Site Active Iron-Based Bifunctional Oxygen Catalyst for a Compressible and Rechargeable Zinc-Air Battery," ACS Nano, 2018, vol. 12, Issue 2, pp. 1949-1958.

Ma, L., et al., "Super-Stretchable Zinc-Air Batteries Based on an Alkaline-Tolerant Dual-Network Hydrogel Electrolyte," Advanced Energy Materials, 2019, vol. 9, Issue 12, 1803046.

Mainar, A.R., et al., "Alkaline aqueous electrolytes for secondary zinc-air batteries: an overview," International Journal of Energy Research, vol. 40, Feb. 5, 2016, pp. 1032-1049.

Milroy, C. A., et al., "Bioelectronic Energy Storage: A Pseudocapacitive Hydrogel Composed of Endogenous Biomolecules," ACS Energy Letters, 2016, vol. 1, Issue 4, pp. 672-677.

Mori, R., "Electrochemical properties of a rechargeable aluminum-air battery with a metal-organic framework as air cathode material," RSC Advances, 2017, vol. 7, Issue 11, pp. 6389-6395.

Muralidharan, N., et al., "A Fully Transient Mechanical Energy Harvester," Advanced Materials Technologies, 2018, vol. 3, Issue 8, pp. 1800083.

Muralidharan, N., et al., "Ultralow Frequency Electrochemical-Mechanical Strain Energy Harvester Using 2D Black Phosphorus Nanosheets," ACS Energy Letters, 2017, vol. 2, Issue 8, pp. 1797-1803.

Narita, F., et al., "A Review on Piezoelectric, Magnetostrictive, and Magnetoelectric Materials and Device Technologies for Energy Harvesting Applications," Advanced Engineering Materials, 2018, vol. 20, Issue 5, pp. 1700743.

Oudenhoven, J. F., et al., "All-Solid-State Lithium-Ion Microbatteries: A Review of Various Three-Dimensional Concepts," Advanced Energy Materials, vol. 1, Issue 1, 2011, pp. 10-33.

Park, J., et al., "All-solid-state cable-type flexible zinc-air battery," Adv Mater, 2015, vol. 27, Issue 8, pp. 1396-1401.

Pikul, J. H., et al., "High-power lithium ion microbatteries from interdigitated three-dimensional bicontinuous nanoporous electrodes," Nature Communications, Apr. 2013, vol. 4, Issue 1, pp. 1-5.

Pikul, J. H., et al., "Powering the Internet of Things," Joule, 2018, vol. 2, Issue 6, pp. 1036-1038.

Qi, M., et al., "In A fast-moving electrostatic crawling insect," 2017 IEEE 30th International Conference on Micro Electro Mechanical Systems (MEMS), Jan. 22-26, 2017, pp. 761-764.

Rahman, M. A., et al., "High Energy Density Metal-Air Batteries: A Review," Journal of The Electrochemical Society, 2013, vol. 160, Issue 10, A1759-A1771.

Raj, A., et al., "Review—Power Sources for the Internet of Things," Journal of The Electrochemical Society, 2018, vol. 165, Issue 8, pp. B3130-B3136.

Rus, D., et al., "Design, fabrication and control of soft robots" Nature, 2015, vol. 521, Issue 7553, pp. 467-475.

Selvan, K. V., et al., "Micro-scale energy harvesting devices: Review of methodological performances in the last decade," Renewable and Sustainable Energy Reviews, 2016, vol. 54, pp. 1035-1047.

Song, W. J., et al., "Stretchable Aqueous Batteries: Progress and Prospects," ACS Energy Letters, 2019, vol. 4, Issue 1, pp. 177-186.

St. Pierre, R., et al., "Toward Autonomy in Sub-Gram Terrestrial Robots," Annual Review of Control, Robotics, and Autonomous Systems, May 2019, vol. 2, pp. 231-252.

Sumboja, A., et al., "Progress in development of flexible metal-air batteries," Functional Materials Letters, 2016, vol. 9, Issue 2, pp. 1630001.

Toussaint, G., et al., "Development of a rechargeable zinc-air battery," ECS Transactions, Jan. 2010, vol. 28, Issue 32, pp. 25-34.

Xu, Y., et al., "An All-Solid-State Fiber-Shaped Aluminum-Air Battery with Flexibility, Stretchability, and High Electrochemical Performance," Angew Chem Int Ed Engl, 2016, vol. 55, Issue 28, pp. 7979-7982.

Xu, Y., et al., "Flexible, Stretchable, and Rechargeable Fiber-Shaped Zinc-Air Battery Based on Cross-Stacked Carbon Nanotube Sheets," Angewandte Chemie International Edition, 2015, vol. 54, Issue 51, pp. 15390-15394.

(56) References Cited

OTHER PUBLICATIONS

Xue, X., et al., "Hybridizing Energy Conversion and Storage in a Mechanical-to-Electrochemical Process for Self-Charging Power Cell," Nano Letters, 2012, vol. 12, Issue 9, pp. 5048-5054.
Yang, G. Z., et al., "The grand challenges of Science Robotics," Science Robotics, Jan. 2018, 3, pp. 1-15.
Zhang, X., et al., "Recent progress in rechargeable alkali metal-air batteries," Green Energy & Environment, 2016, vol. 1, Issue 1, pp. 4-17.
Zhang, Z., et al., "All-solid-state Al-air batteries with polymer alkaline gel electrolyte," Journal of Power Sources, 2014, vol. 251, pp. 470-475.
Zhao, Z., et al., "Challenges in Zinc Electrodes for Alkaline Zinc-Air Batteries: Obstacles to Commercialization," ACS Energy Letters, 2019, vol. 4, Issue 9, pp. 2259-2270.
Zhou, M., et al., "A review on heat and mechanical energy harvesting from human—Principles, prototypes and perspectives" Renewable and Sustainable Energy Reviews, 2018, vol. 82, pp. 3582-3609.

\* cited by examiner

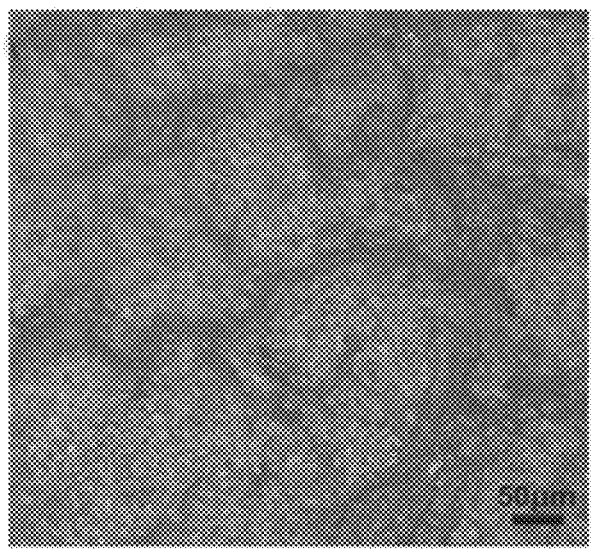
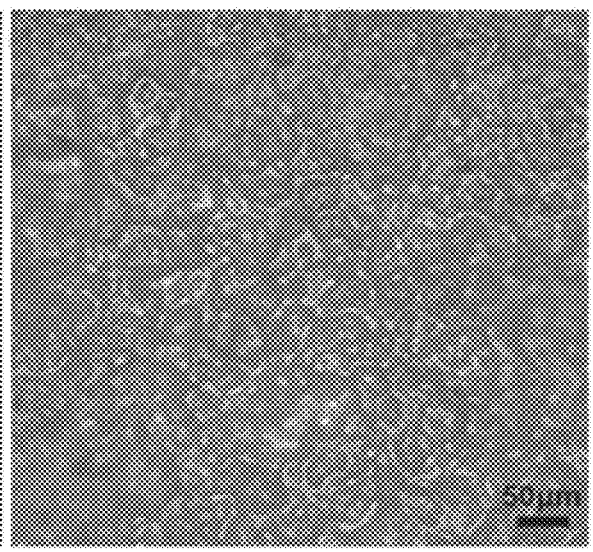
FIG. 12A  FIG. 12B
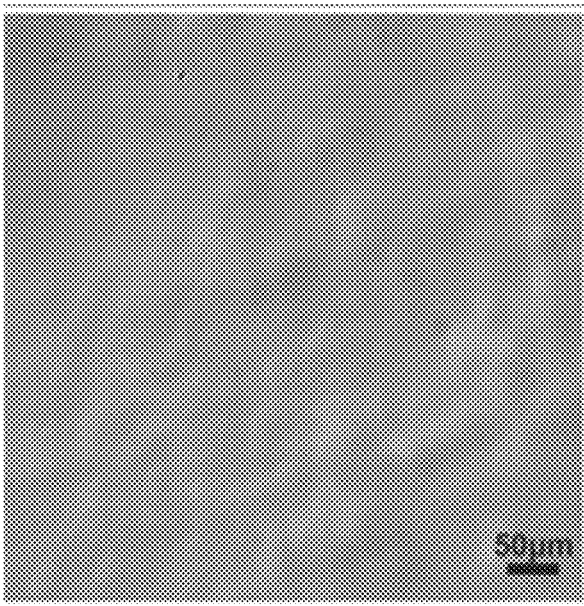
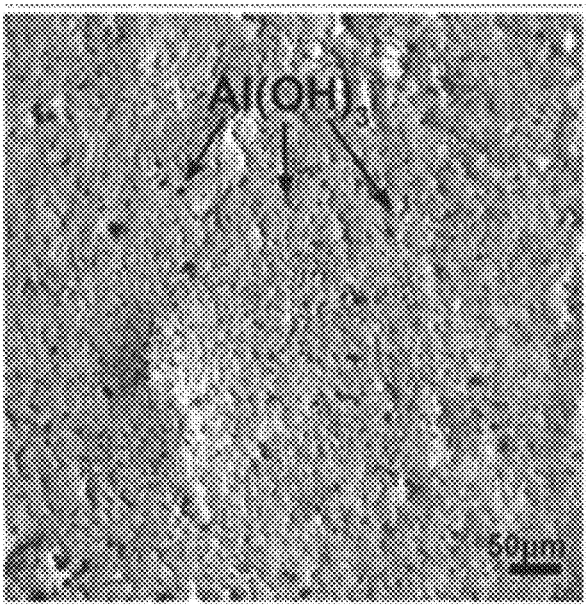
FIG. 12C  FIG. 12D
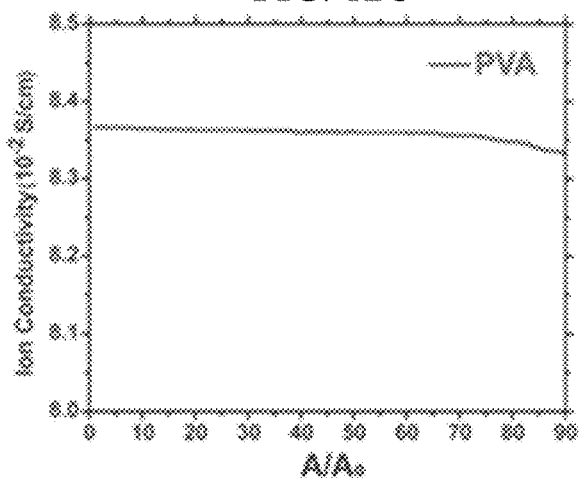
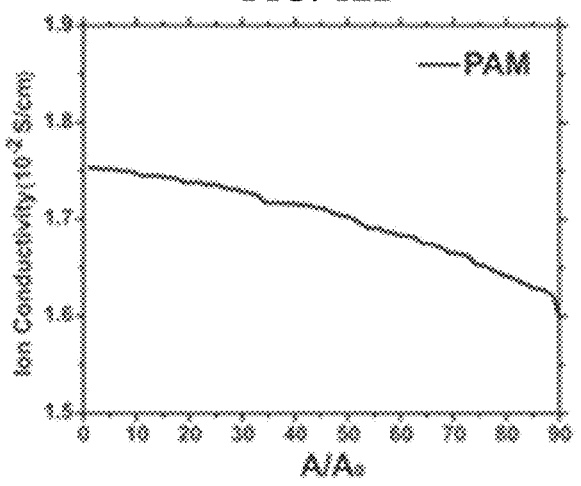
FIG. 12E  FIG. 12F

METAL AIR SCAVENGER—AN ENERGY HARVESTING TECHNOLOGY FOR POWERING ELECTRONICS AND ROBOTICS

CROSS-REFERENCE TO RELATED APPLICATIONS

The present application is the National Stage Application of International Patent Application No. PCT/US2020/017952 (filed Feb. 12, 2020), which claims priority to and the benefit of U.S. Patent Application No. 62/804,345, "Metal Air Scavenger—An Energy Harvesting Technology For Powering Electronics And Robotics" (filed Feb. 12, 2019), the entireties of which is foregoing applications are incorporated herein for any and all purposes.

TECHNICAL FIELD

The present disclosure relates to the field of metal-air batteries.

BACKGROUND

There is vast literature explaining how internet connected devices, which are expected to grow in number from 27 billion in 2017 to 125 billion by 2030, will transform the way we operate and manage complex systems like supply chains, threat-detecting sensor networks, and logistics. The present inability to power microelectronics with size-comparable energy sources, however, is an often-overlooked challenge that severely restricts the application of microelectronics.

At present, there are two major strategies for powering microelectronics: (1) harvesting thermal, mechanical, electromagnetic, or solar energy from the local environment or (2) delivering energy stored in an on-board battery or fuel cell. Although individually useful in specific applications, these approaches have several limitations. Energy harvesting has a low energy conversion efficiency, which means energy harvesters typically provide a low power density output (also typically periodic in nature) in limited environments restricted to having the correct attributes for the energy harvesting device (for example, access to sunlight, high temperature heat sources, or high frequency vibrations). Overall, the limited power and need for precise operating conditions of energy harvesters and the limited energy supplied by batteries severely restrict the useful applications of off grid microelectronics and internet connected devices. Accordingly, there is a long-felt need for ways to power microelectronic devices disconnected from the electrical grid.

SUMMARY

Provided here is a new approach to power microelectronic devices that involves harvesting energy from metal surfaces that are prolific in urban and industrial environments using a metal-air scavenger (MAS). A MAS can be attached to exposed metal surfaces and deliver power by electrochemically oxidizing the metal surface and reducing oxygen in the air.

A MAS provides unique advantages over previous strategies (harvesting and storage). First, MAS devices are not limited in total energy by their volume, like a battery, because the energy storage materials (metal, oxygen, and sometimes water) are prolific in the environment and the exposed metal surface areas (e.g., in $m^2$ for metal surfaces) are orders of magnitude larger than the microelectronic devices that MAS devices power ($cm^2$).

Second, metal is a very energy dense material. Aluminum and iron, for example, have 84 and 40 MJ/L theoretical energy densities, which densities are higher than gasoline (34 MJ/L) and up to 40 times greater than current state of the art lithium ion battery technologies (2 MJ/L). Third, MAS devices can provide a constant power output and peak power output similar to batteries because they use the same electrochemical physics as metal-air batteries. Fourth, metal-air scavengers allow electronic devices to access areas not available with current energy harvesting technologies (for example, on the side of a building not exposed to sun, inside cargo containers, underground, or underwater).

In one aspect, the present disclosure provides power cells, comprising: an electrolyte, the electrolyte being characterized as being solid or semi-solid; and a cathode in electronic communication with the electrolyte, the cathode being configured to support reduction of oxygen from an environment exterior to the power cell; and an electrical load in electronic communication with the cathode, the power cell being (a) configured to reversibly place the electrolyte into stationary electronic communication with a metal exterior to the power cell, (b) configured to effect relative motion between the electrolyte and a metal exterior to the power cell.

Also provided are methods, comprising operating a power cell according to the present disclosure so as to oxidize the metal exterior to the power cell and reduce oxygen from the environment exterior to the power cell so as to power the electrical load. As described elsewhere herein, the electrical load can comprise a motor, an actuator, a sensor, a light source, a signal source, and the like.

Further provided are methods of powering an electrical load, comprising: with an electrical load in electronic communication with (i) a power cell that comprises an electrolyte and a cathode configured to support reduction of oxygen from an environment exterior to the power cell and (ii) a metal anode, the metal anode being a metal exterior to the power cell, effecting oxidation of the metal anode and reduction of environmental oxygen so as to power the electrical load.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various aspects discussed in the present document. In the drawings:

FIGS. 12A and 12B provide, respectively, optical photos of PVA hydrogel before and after discharging on aluminum over 90× the MAS area. FIGS. 12C and 12D provide, respectively, optical photos of PAM hydrogel before and after discharging on aluminum over 90× the MAS area. FIGS. 12E and 12F provide, respectively, the ionic conductivity of PVA and PAM during discharge on aluminum surfaces shown in FIGS. 12A-12D.

DETAILED DESCRIPTION OF ILLUSTRATIVE EMBODIMENTS

Figure 1:
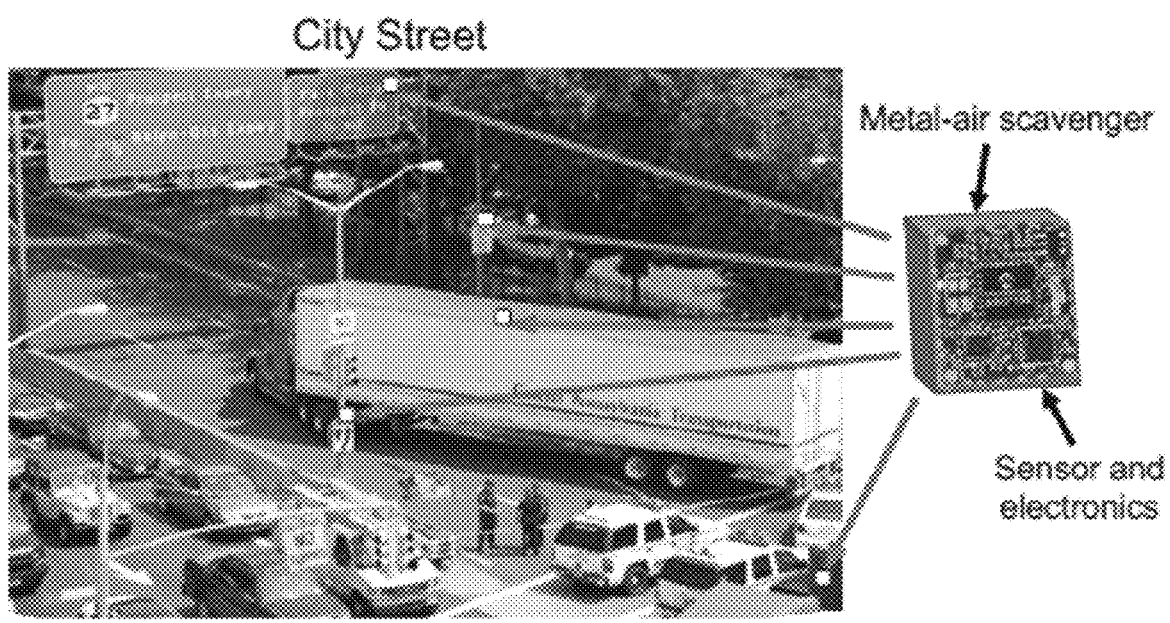
FIG. 1 provides a depiction of a device according to the present disclosure deployed on a highway sign and using the sign as a part of the energy source used to power the device.

The present disclosure may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention.

Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable, and it should be understood that steps can be performed in any order.

It is to be appreciated that certain features of the invention which are, for clarity, described herein in the context of separate embodiments, can also be provided in combination in a single embodiment. Conversely, various features of the invention that are, for brevity, described in the context of a single embodiment, can also be provided separately or in any subcombination. All documents cited herein are incorporated herein by reference in their entireties for any and all purposes.

Further, reference to values stated in ranges include each and every value within that range. In addition, the term "comprising" should be understood as having its standard, open-ended meaning, but also as encompassing "consisting" as well. For example, a device that comprises Part A and Part B can include parts in addition to Part A and Part B, but can also be formed only from Part A and Part B.

Provided herein are metal air scavengers (MAS), half-cells that use metal surfaces to harvest energy for powering microelectronic devices. A MAS device can be attached to an exposed metal surface that delivers power by electrochemically oxidizing the metal surface. Given the ubiquity of metal surfaces in the industrial environment and the high theoretical energy density of such metals, MAS can harvest energy and power microelectronic devices both off the grid and over a significant period of time, even years.

Metal air scavengers can be alternatives to lithium-ion batteries and other energy harvesting methods given the high theoretical energy density of many metals. The MAS concept includes an anode, external cathode of ambient air, and aqueous (or non-aqueous) electrolytes, where energy is generated from an oxygen reduction reaction in the air cathode while the anode is oxidized. An anode can comprise, e.g., pure metal, but can also comprise an oxide layers. Anodes that contain more than about 10% pure metal are especially suitable. Metal air scavengers (MAS) described in this disclosure are a form of metal-air batteries that use this same electrochemistry.

In practice, energy can be electrochemically extracted from a high energy metal surface through a thermodynamically favorable Gibbs free energy differential between oxygen reduction reaction in the air cathode and the metal oxidation reaction on the metal surface. Electrons released from the metal anode are transported to the cathode, resulting in current flow. In a MAS the electrolyte can be a solid (or a semi-solid) connecting the two electrodes. This allows ions to flow but prevents the flow of electrons. The electrolyte can be a hydrogel (e.g., a hydrogel that includes water), and can be a solid or semi-solid to achieve an interface that can move across a metal surface without fluid loss. Without being bound to any particular theory, a hydrogel electrolyte can effect increased stability and safety, with the added benefit of conferring some flexibility and stretchability on the device.

An embodiment of the disclosed technology can have a moveable cell or a cell that moves itself across the metal surface where it can electrochemically oxidize the exposed metal surface leaving behind an oxidized surface while using the energy it converted from the surface.

FIGURES

The attached non-limiting figures illustrate certain aspects of the disclosed technology.

FIG. 1 provides a diagram showing a MAS and where it can be used. As an example, there are a wide variety of exposed metal surfaces in a city and in transportation infrastructure that can support a metal-air scavenger without adversely affecting the strength of the metal structures. Some non-limiting examples include, e.g., building exhaust pipes, sewers, rails, screws, or joists, signs, the insides and outsides of cargo containers, and subways cars.

As shown, a MAS device according to the present disclosure can be deployed on a highway sign, using the metal of that sign as an anode. The MAS device can include sensors, e.g., weather sensors, traffic sensors, and the like. In this way, the device can report on conditions local to the device. The device can also include an acutator, e.g., a motor configured to advance the device along the metal of the sign so as to allow the device to utilize the metal of the sign as an anode.

Figure 2:
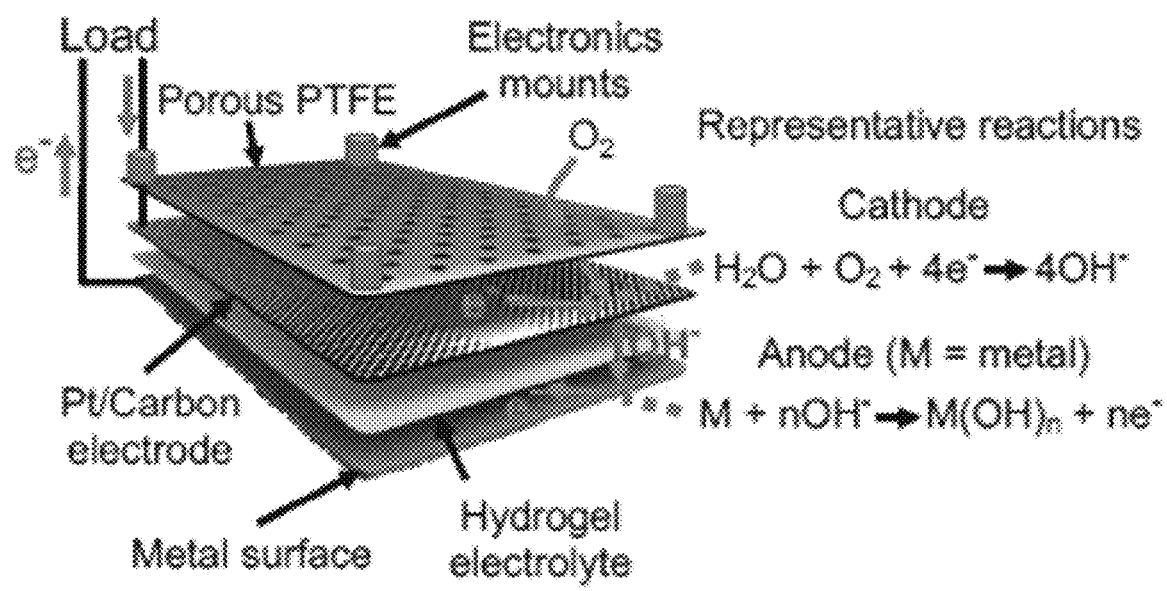
FIG. 2 provides an exploded view of a cell according to the present disclosure.

FIG. 2 provides a schematic of a MAS, which can include three layers of a hydrogel, a carbonaceous cathode with catalyst (e.g., platinum), and a porous polytetrafluoroethylene cap to reduce or prevent moisture loss. As shown, oxygen can diffuse through a cap (e.g., one made from PTFE) to the cathode, where the oxygen can be reduced with water to form hydroxide ions. (A cap is optional, but can be advantageous in some circumstances.) Hydroxide ions are transported through the hydrogel electrolyte (which can be alkaline) to the anode, where the metal is oxidized to produce a metal hydroxide. Some metals can further react to form a metal oxide and release water. The practical potential of a MAS depends on the metal anode; for example, the potential is 1.4 and 1.2 volts for Al and Zn, respectively.

Figure 3:
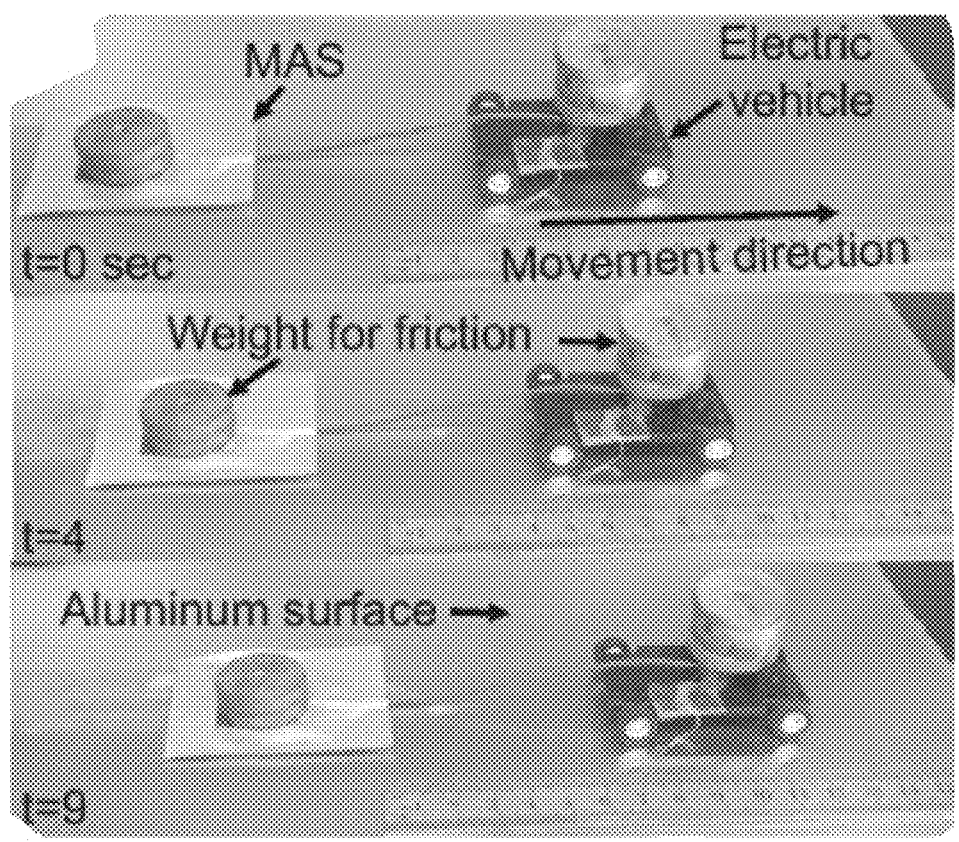
FIG. 3 provides an illustration of an electric vehicle powered by a device according to the present disclosure.

FIG. 3 provides a MAS-powered device, which can travel continuously on a metal surface. An exemplary vehicle moved at 3 mm/s and demonstrates the ability to access energy from locations across a metal surface. As shown in FIG. 3, a power cell according to the present disclosure can be configured such that the cell is towed behind a vehicle or motorized device; the power cell can also be incorporated into or onto the motorized device as well.

Figure 4:
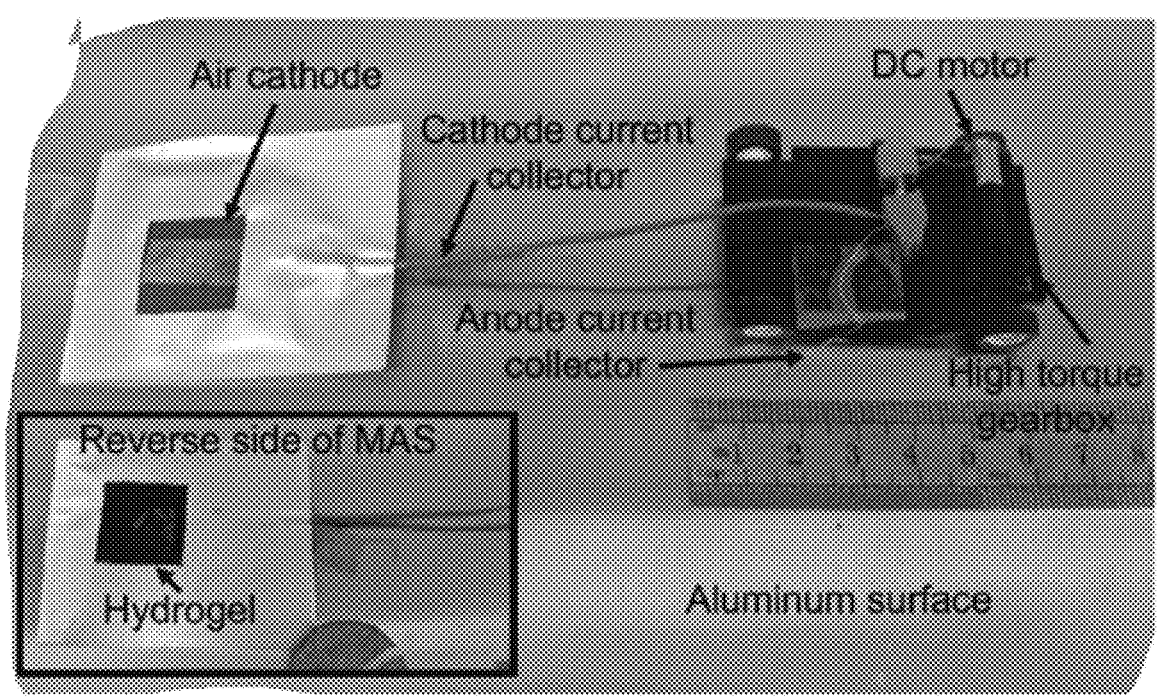
FIG. 4 provides a view of various components of a device according to the present disclosure in electronic communication with a motor-powered vehicle.

FIG. 4 provides further views of the exemplary MAS-powered vehicle, in which a poly(vinyl alcohol) electrolyte was used. As shown, the cathode was exposed to ambient air (as an oxygen source), and was also placed into electrical communication with a motor on the vehicle. A hydrogel was placed into electrical communication with a metal anode (aluminum, in this instance).

Figure 5:
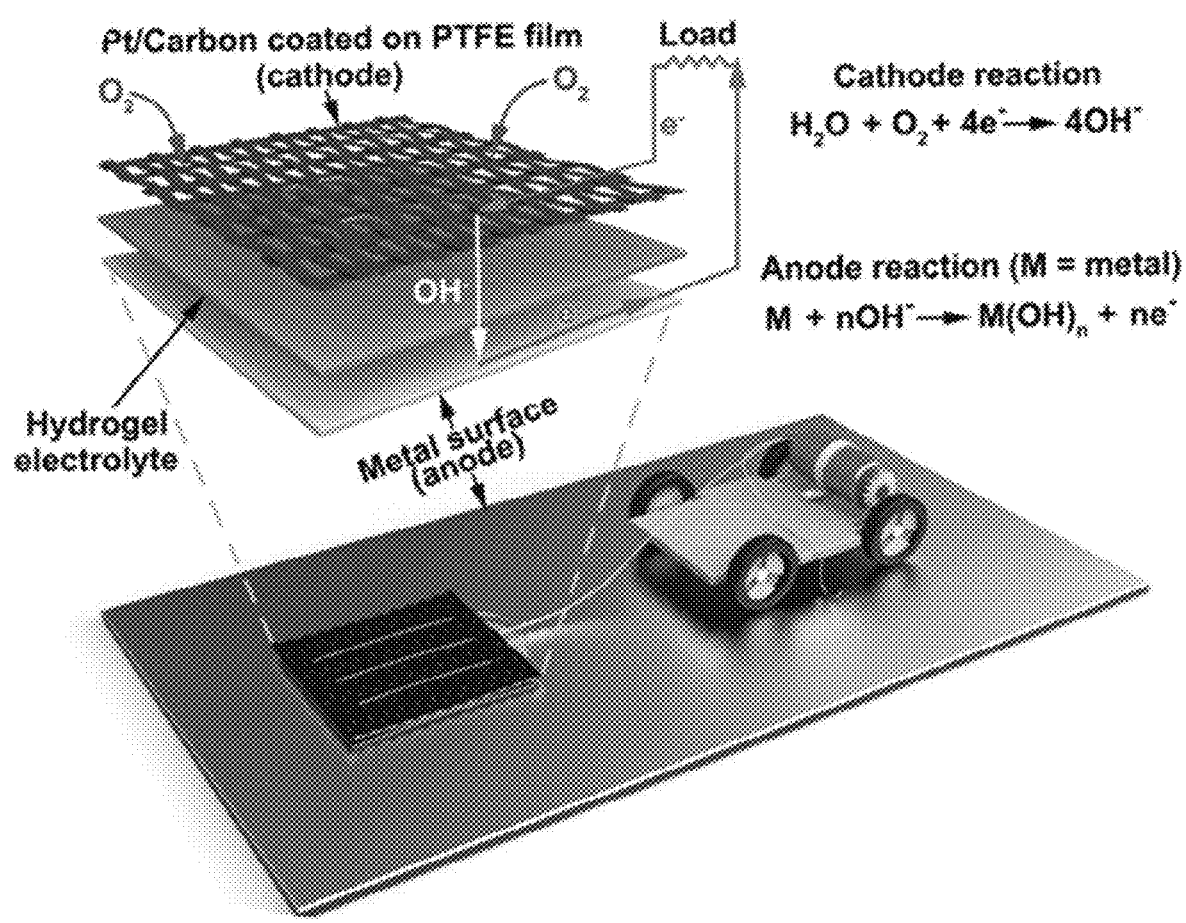
FIG. 5 provides an exploded view of a device according to the present disclosure.

FIG. 5 provides an illustration of a self-powered electric vehicle, which consisted of three layers of a Pt/carbon coated on PTFE film, a hydrogel electrolyte and metal sheets, as well as the reactions associated with each layer.

Figure 6:
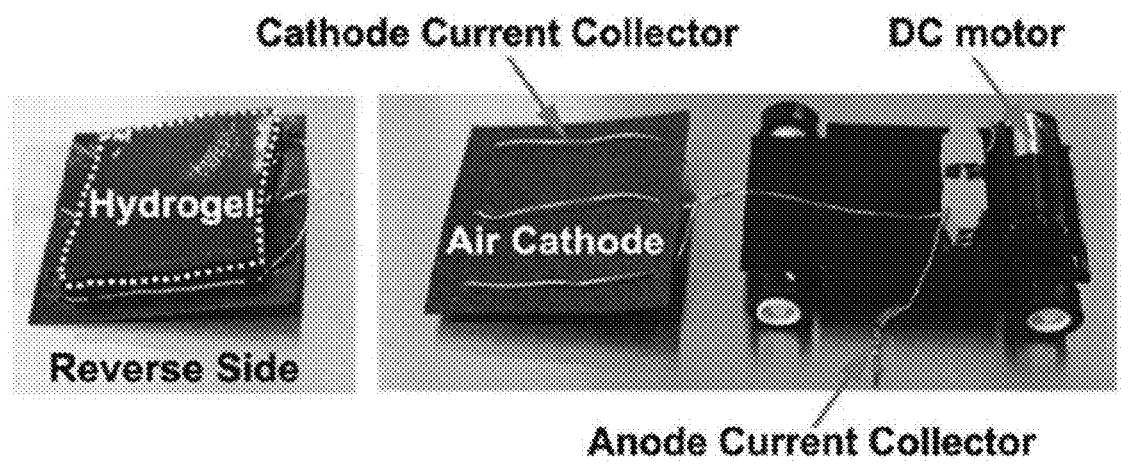
FIG. 6 provides views of a device according to the present disclosure.

FIG. 6 provides additional detail of an electric vehicle powered by a MAS device.

Figure 7:
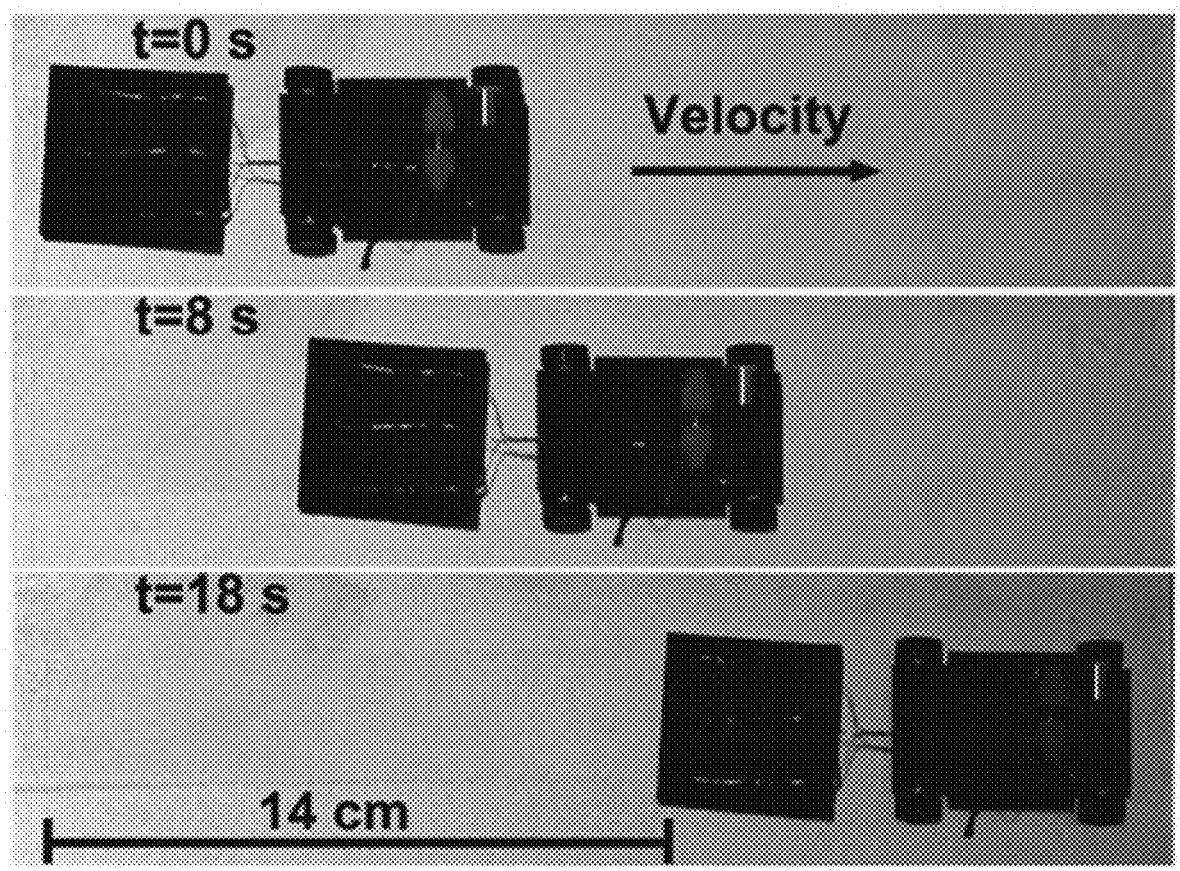
FIG. 7 provides images taken of a vehicle powered by a device according to the present disclosure.

FIG. 7 provides images showing that the self-powered electric vehicle could travel continuously on a metal surface at a speed of 7.8 mm/s.

Figure 8:
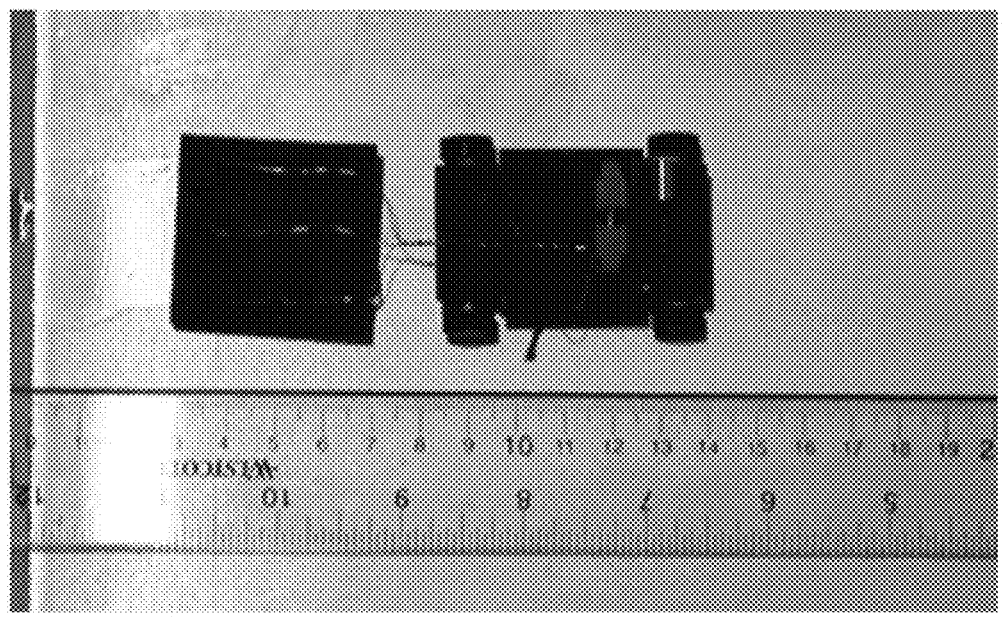
FIG. 8 provides an image of a vehicle according to the present disclosure.

FIG. 8 provides an image of the exemplary self-powered electric vehicle with a ruler, for scale.

Figure 9A:
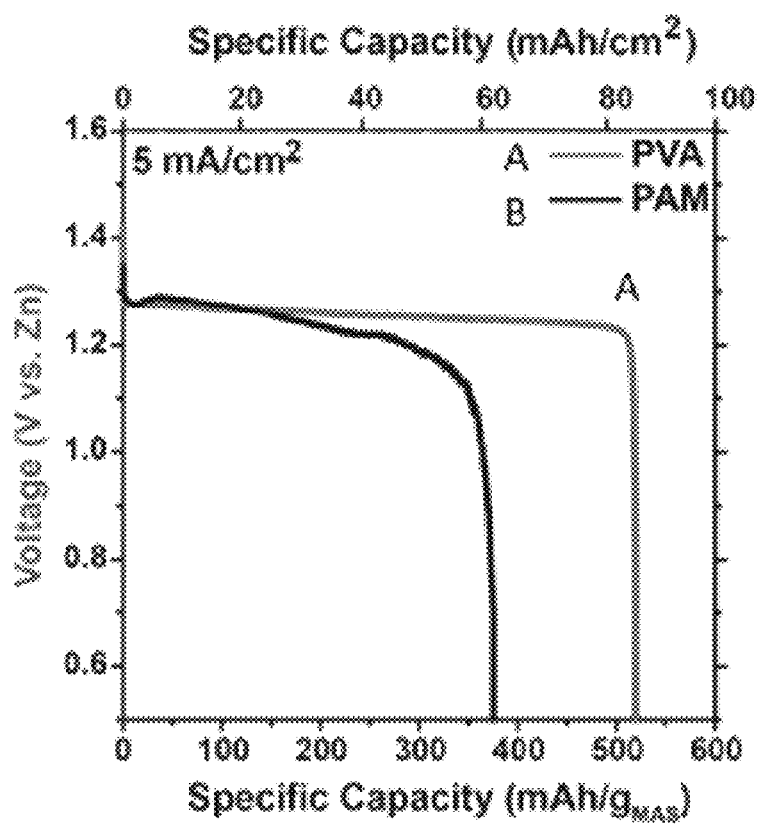
FIG. 9A provides output voltage versus specific capacities of MAS with PVA and PAM electrolytes on a zinc surface. The discharge current density was 5 mA/cm$^2$, FIG. 9B provides output voltage versus specific capacities of MAS with PVA electrolytes on aluminum, zinc, and stainless-steel surfaces. The discharge current density was 5 mA/cm$^2$, FIG. 9C provides polarization curves (V-I) and corresponding power densities of a MAS with PVA and PAM electrolytes on a zinc surface, and FIG. 9D provides polarization curves (V-I) and corresponding power densities of a MAS with PVA electrolytes on aluminum, zinc, and stainless-steel surfaces.
Figure 9B:
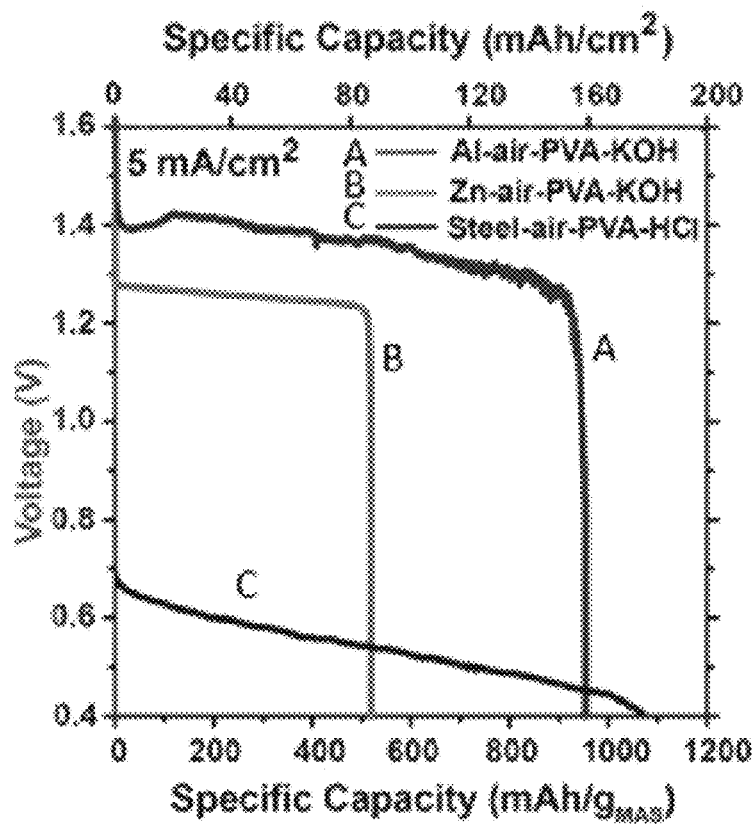
Figure 9C:
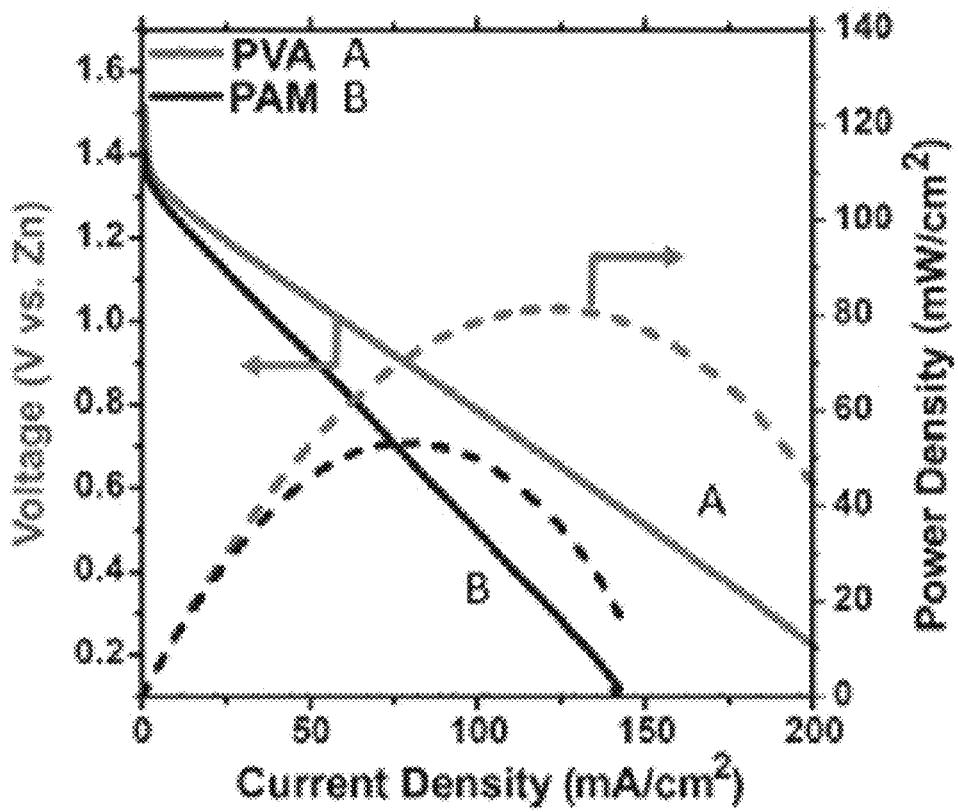
Figure 9D:
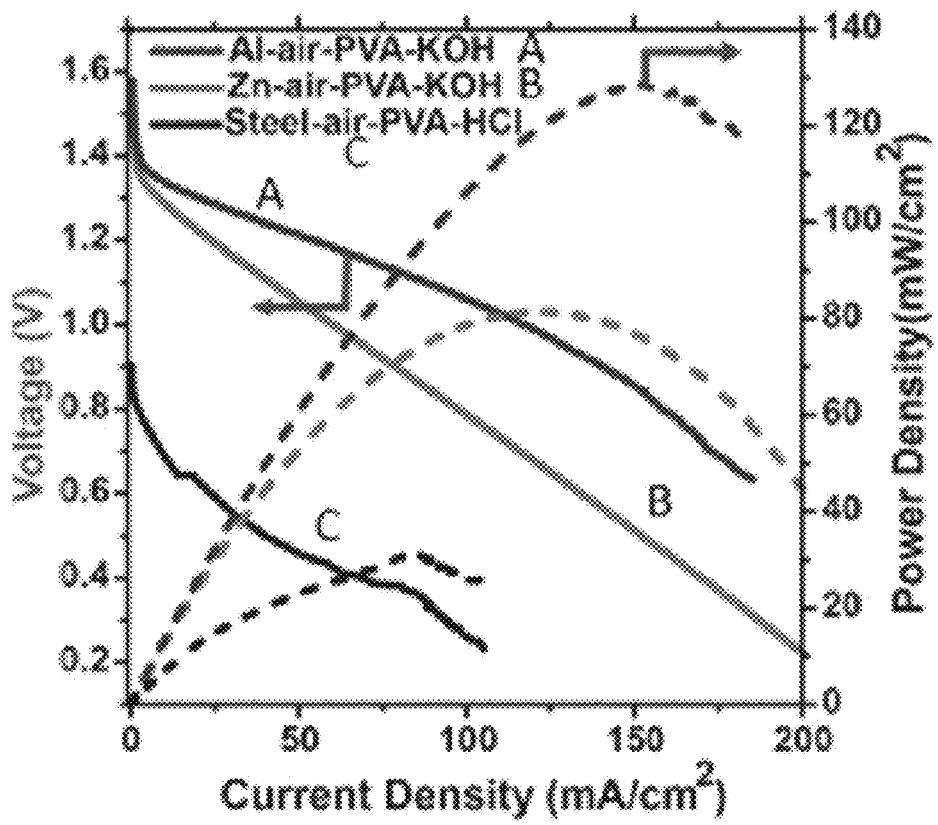

FIG. 9A provides output voltage versus specific capacities of MAS with PVA and PAM electrolytes on a zinc surface. The discharge current density was 5 mA/cm$^2$, FIG. 9B provides output voltage versus specific capacities of MAS with PVA electrolytes on aluminum, zinc, and stainless-steel surfaces. The discharge current density was 5 mA/cm$^2$, FIG. 9C provides polarization curves (V-I) and corresponding power densities of a MAS with PVA and PAM electrolytes on a zinc surface, and FIG. 9D provides polarization curves (V-I) and corresponding power densities of a MAS with PVA electrolytes on aluminum, zinc, and stainless-steel surfaces.

Figure 10A:
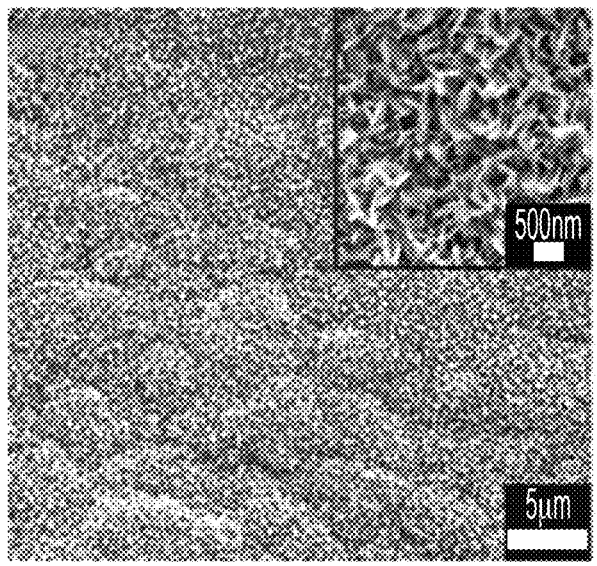
FIG. 10A provides a SEM image of a zinc surface at a PVA hydrogel interface (inset: high magnification image), and FIG. 10B provides a SEM image of a zinc surface at a PAM hydrogel interface (inset: high magnification image).
Figure 10B:
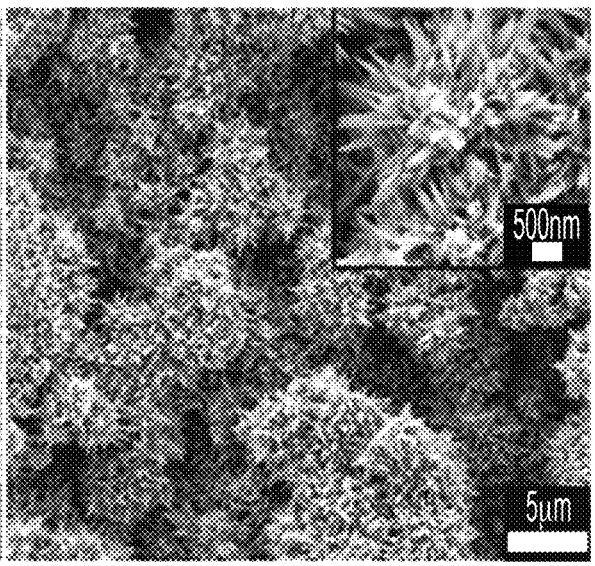

FIG. 10A provides a SEM image of a zinc surface at a PVA hydrogel interface (inset: high magnification image), and FIG. 10B provides a SEM image of a zinc surface at a PAM hydrogel interface (inset: high magnification image).

Figure 11A:
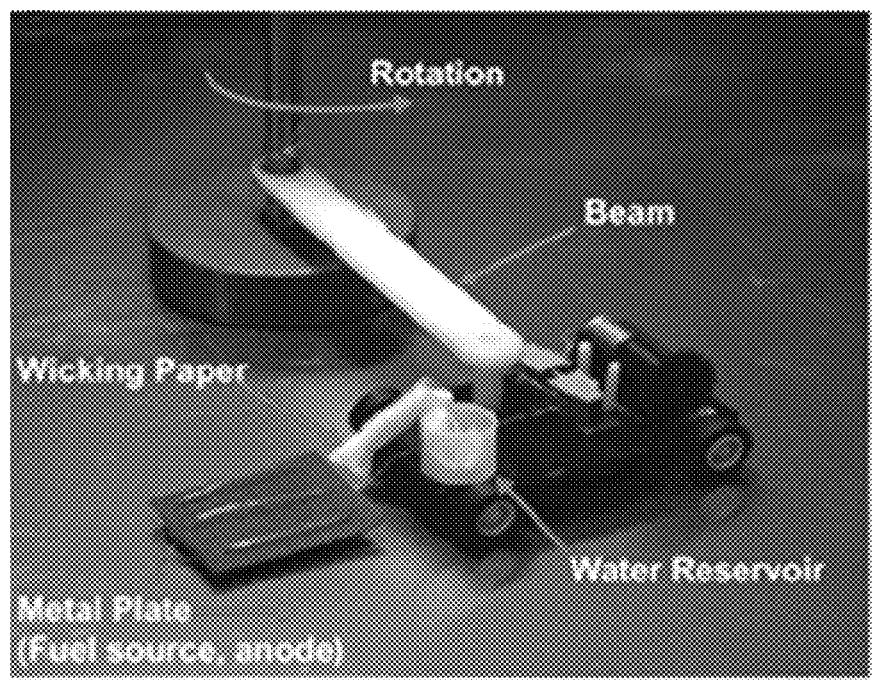
FIG. 11A provides a photograph of a MAS-powered electric vehicle constrained to move along in circle on a metal plate. Wicking paper transports water stored in a reservoir to the hydrogel.
Figure 11B:
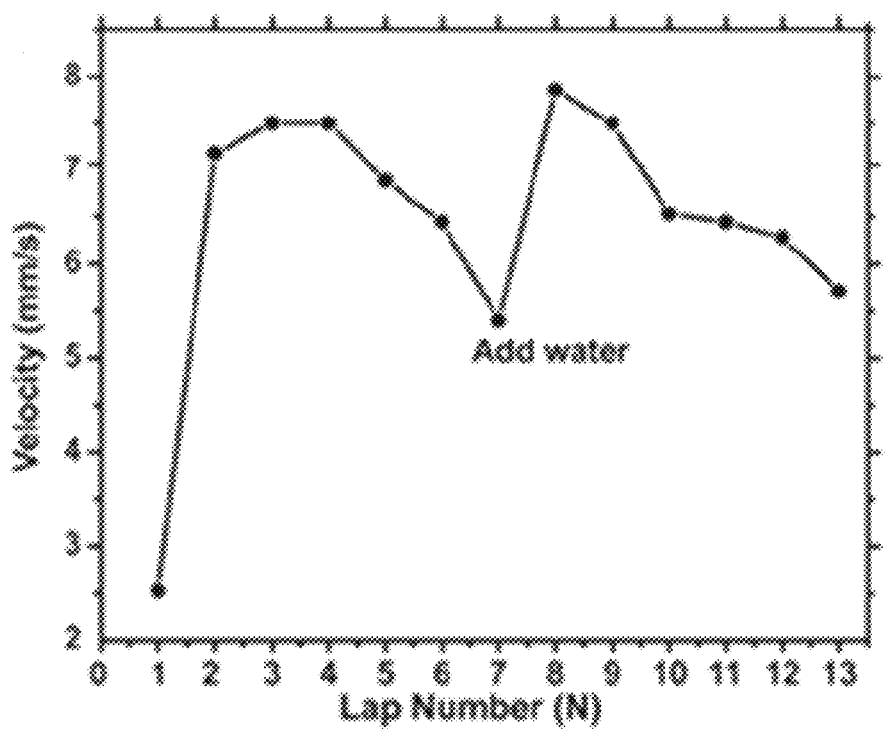
FIG. 11B provides the velocity of the MAS-powered electric vehicle in FIG. 11A, per lap. Water is added in the 7th lap.
Figure 11C:
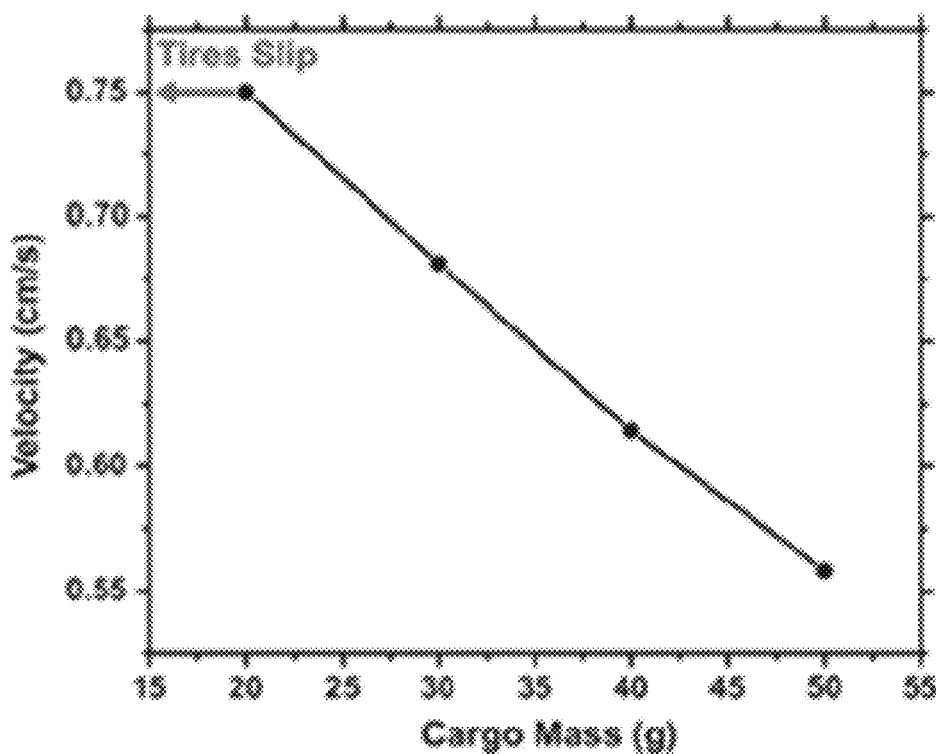
FIG. 11C provides the maximum velocity of the MAS-powered electric vehicle when carrying increased cargo mass.
Figure 11D:
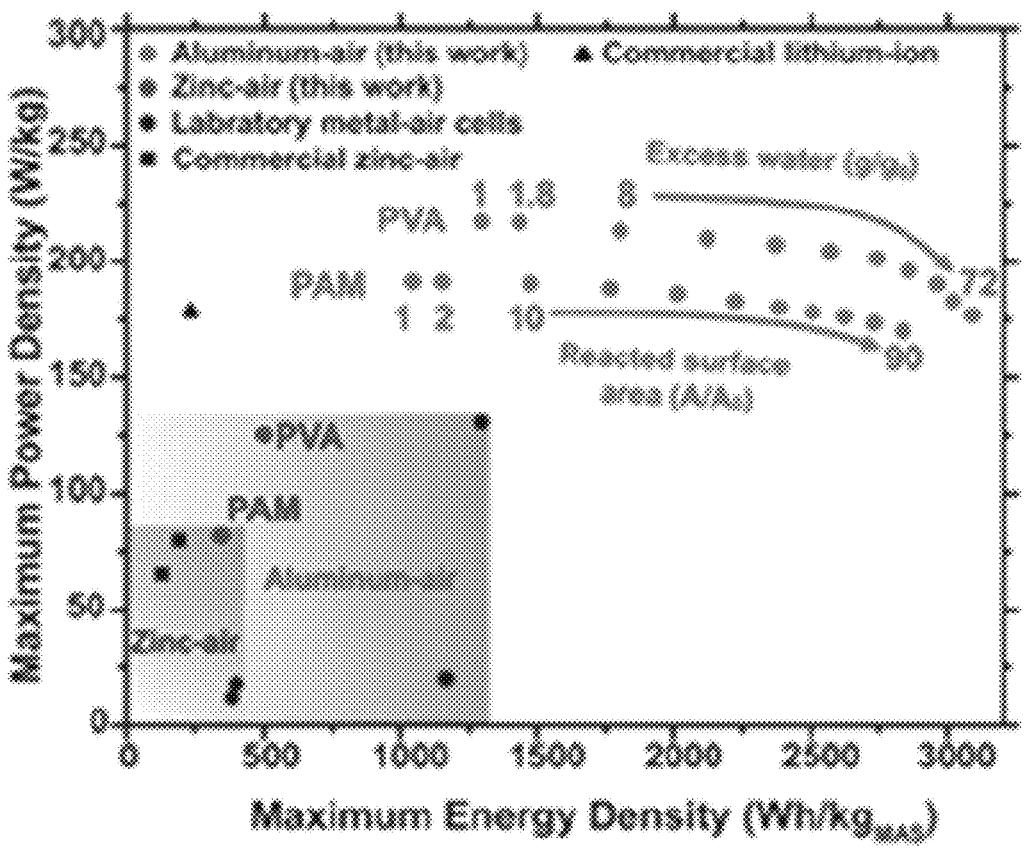
FIG. 11D provides a Ragone plot comparing the energy and power density of our hydrogel-based metal air cells to commercial and laboratory metal-air cells ($A_0$=6 cm$^2$, $g_0$=1 gram).

FIG. 11A provides a photograph of a MAS-powered electric vehicle constrained to move along in circle on a metal plate. Wicking paper transports water stored in a reservoir to the hydrogel. FIG. 11B provides the velocity of the MAS-powered electric vehicle in FIG. 11A, per lap. Water is added in the 7th lap. FIG. 11C provides the maximum velocity of the MAS-powered electric vehicle when carrying increased cargo mass. FIG. 11D provides a Ragone plot comparing the energy and power density of our hydrogel-based metal air cells to commercial and laboratory metal-air cells ($A_0$=6 cm$^2$, $g_0$=1 gram).

FIGS. 12A and 12B provide, respectively, optical photos of PVA hydrogel before and after discharging on aluminum over 90× the MAS area. FIGS. 12C and 12D provide, respectively, optical photos of PAM hydrogel before and after discharging on aluminum over 90× the MAS area. FIGS. 12E and 12F provide, respectively, the ionic conductivity of PVA and PAM during discharge on aluminum surfaces shown in FIGS. 12A-12D.

Additional Disclosure

The present disclosure provides a new approach for powering robots and electronics by electrochemically scavenging energy from metal surfaces, which breaks energy storage scaling laws by allowing robots and electronics to extract energy from large volumes of energy dense material without having to carry the material on-board.

Exemplary hydrogel electrolyte compositions were combined with air cathodes to extract 159, 87, and 179 mAh/cm$^2$ capacities from aluminum, zinc, and steel surfaces at up to 130, 81, and 25 mW/cm$^2$ power densities, which exceed the power density of the best energy harvesters by 10×. When moving across a metal surface, metal scavenging exceeds the energy densities of lithium ion and metal-air batteries by 13× and 2×. Metal scavenging is especially beneficial for small robots and electronics, whose size and performance are severely limited by the low energies provided by micro energy storage technologies.

The low gravimetric and volumetric energy densities of energy storage technologies are a major limitation for realizing the potential of modern robots and electronics. In some cases, the energy storage technologies required to power robotic systems are too large or massive for a robot to carry, leading to limited operational times and long recharging times over which the robot remains unused. Energy storage is especially restrictive for small robots, vehicles, and electronics, as the total available energy unfavorably scales with the device volume ($L^3$), while the performance of electronics increases as they get smaller ($1/L^2$), following Moore's law. In one example, the energy stored on a 47 mg autonomous robot could only provide power for ten seconds.

A common approach to overcome the energy storage limitations of batteries is to develop electrodes with increased energy density. In a conventional battery, anode and cathode improvements are needed simultaneously as both electrodes contribute to the mass and volume of the battery. In metal-air batteries, however, oxygen for the cathode reaction can be extracted from air and therefore does not contribute to the initial battery mass or volume, although the oxygen mass is added during discharge. The reduced weight of the oxygen electrode and high energy density of metal anodes result in high theoretical energy densities. Aluminum-air, zinc-air, and iron-air batteries have 8.1, 1.5, and 1.2 kWh/kg theoretical energy densities, which are 5-32 times larger than commercial lithium ion batteries. Practical metal-air batteries, however, achieve only a fraction of their theoretical energy densities (350-500 Wh/kg for Zn-air, for example) and suffer from poor rechargeability due to passivation, dendrite growth, and hydrogen evolution on metal anodes, and electrolyte reactivity with $CO_2$.

Energy harvesters that extract energy from their environment provide an interesting alternative for powering robotics and electronics as they can provide a large amount of energy over their lifetime. The best energy harvesters, however, cannot output power densities much greater than 10 mW/cm$^2$, and electrochemistry-based harvesters have lower output power densities, typically <0.1 mW/cm$^2$, which limit their application.

In this disclosure, we show that semi-solid hydrogel electrolytes with oxygen reduction cathodes, a device one can call a metal-air scavenger (MAS), can electrochemically extract energy from large areas of a metal surface to achieve high energy and power density, combining the benefits of batteries and energy harvesters. A MAS facilitates the electrochemical reactions that occur in metal-air batteries, but the anode and cathode are both external to the MAS. We show that, when stationary, an example MAS can extract 159 mAh/cm$^2$, 87 mAh/cm$^2$, and 179 mAh/cm$^2$ from aluminum, zinc, and stainless-steel surfaces at up to 130, 81, and 25 mW/cm$^2$ power densities.

A principal advantage of the MAS is that it can continue to power a device as it travels across a metal surface, so that the total mass and volume of metal oxidized are many multiples of the mass and volume of the device. This property of the MAS breaks energy storage scaling laws by allowing small robots and electronics to extract energy from large volumes of energy dense material without having to carry the material on-board. We characterize the metal, hydrogel, and electrochemical properties of the MAS as it traverses metal surfaces with ninety times the MAS area. Finally, we demonstrate the utility of a traveling MAS by powering a 5×3×1 cm electric vehicle on aluminum and zinc surfaces with a 2×3×0.2 cm MAS. When storing excess water, a traveling MAS can achieve 3,082 Wh/kg$_{MAS}$ energy densities on aluminum surfaces, which is more than 2 times larger than the best aluminum-air batteries fabricated to date, and 12 times greater than commercial lithium-ion batteries (243 Wh/kg)[3].

FIG. 5 provides a schematic of a MAS, which comprises a cathode current collector and hydrogel electrolyte. The cathode current collector was a porous carbon felt embedded with platinum (Pt) catalyst (0.5 mg/cm$^2$) and coated on one side with polytetrafluoroethylene (PTFE). When placed on a metal surface, the MAS converted the Gibbs free energy difference between the metal surface and oxygen in the environment to electrical work through electrochemical redox reactions. During this process, the oxidized metal released electrons and, depending on the anode, was converted to a metal ion that formed hydroxide or metal oxide products. The electrons traveled to the cathode and reduced oxygen to form hydroxide ions, powering the external electronics and vehicle in the process. We call this device a scavenger because it works on excess metal already available in the environment, and the depth of metal oxidation is typically <100 μm, which is unlikely to compromise the metal strength as it is below the safety factor of macroscopic engineered devices.

FIG. 6 is a photograph of 3-D printed vehicle powered by an electric motor connected to a trailing MAS cathode through a nickel wire. To complete the circuit, an anode current collector was connected to the metal surface on the vehicle side. The hydrogel was either about 3 mm thick polyacrylamide (PAM) or poly (vinyl alcohol) (PVA) saturated with 6 M KOH or 1M HCl aqueous solution.

FIG. 7 shows the MAS powered vehicle moving across an aluminum surface at 7.8 mm/s or 0.16 body lengths per second. The MAS hydrogel carries the electrolyte, due to its semi-solid nature, so that the electrolyte can be transported across a metal surface while maintaining a high ionic conductivity.

We measured the electrochemical performance of stationary metal-air scavengers on aluminum and zinc sheets, with alkaline PVA and PAM hydrogel electrolytes, and stainless-steel foils, with acidic hydrogels. FIG. 9A shows the voltage versus capacity for PVA- and PAM-based MAS discharged at 5 mA/cm$^2$ on a zinc surface. The full cell potential of the PVA-based MAS was more stable and extracted more capacity than a PAM-based MAS. The PVA-based and PAM-based batteries extracted a specific capacity of 87 mAh/cm$^2$ and 63 mAh/cm$^2$ using a one-gram MAS.

FIG. 9B shows the voltage versus capacity for MAS discharged on aluminum, zinc, and 316 stainless-steel surfaces with PVA hydrogel electrolytes. For each metal, the average potentials were 1.36, 1.26 and 0.65 V and the discharge capacities were 159, 87, and 179 mAh/cm$^2$. The extracted capacities correspond to about 198, 148, and 232 μm of oxidized aluminum, zinc, and steel. After discharge, a single MAS extracted the same capacity as the first discharge when moved to a fresh metal surface and when the electrolyte was replenished with water.

FIG. 9C shows the discharge polarization curves of PVA- and PAM-based MAS on zinc. The linear polarization curves show that the potential losses were primarily ohmic. The PVA-MAS had a peak power density of 81 mW/cm$^2$ at 123.5 mA/cm$^2$. The PVA-MAS had peak power densities of 130 mW/cm$^2$ and 25 mW/cm$^2$ on aluminum and stainless-steel (FIG. 9D). These power densities were ~10× greater than the power density of the best energy harvesters. Overall, the MAS can extract high capacity and power density from zinc, aluminum, and steel surfaces, with aluminum performing the best. (The disclosed technology is not limited to performance with zinc, aluminum, or steel.)

We compared the morphology changes of zinc surfaces after discharges with PVA and PAM to understand how the hydrogels impact the MAS performance. FIG. 10 shows SEM images of zinc surfaces after discharges with PVA (left) and PAM (right) hydrogels. The Zn-PVA morphology included uniform layers of flake-like porous reaction product, while the reaction product in the Zn-PAM system was more dendritic. The Zn-PAM surface roughness was also larger than the Zn-PVA due to local zinc pitting, which reduced the oxidation reaction uniformity and likely led to the reduced performance shown in FIG. 10A.

To study the ability of a MAS to provide power to a moving machine, a MAS powered vehicle was configured to operate continuously in a circle on an aluminum sheet (FIG. 11A). After the first cycle, the aluminum surface oxidized and appeared white. The operating potential of the moving MAS was 1.3-0.8 V.

FIG. 11B shows the average vehicle lap speed for the first 13 laps. The first lap speed was 2.53 mm/s. The speed increased after the first lap to a maximum of 7.9 mm/s as the electrochemical kinetics increased after the native oxide layer was penetrated. The vehicle stopped in the 7th lap due to water loss in the hydrogel electrolyte, which occurred due to evaporation, adsorption on the metal surface, and water consumption in the oxygen reduction reaction.

On a zinc surface, there is no net water loss from reactions as the water volume consumed in the cathode reaction was released in the anode reaction. On aluminum, however, water was not replaced in the anode reactions and needed to be added for the MAS to operate continuously. The water loss generated a spatial hydration gradient in the hydrogel that decreased the hydrogel ionic conductivity and volume until the output potential reached 0.94V, at which point the MAS could not deliver enough power to overcome the friction forces, and the vehicle stopped. The vehicle was rehydrated with pure water in cycle 7 and began operating normally until the hydrogel was dehydrated again.

FIG. 11C shows how increasing the cargo mass affected the vehicle velocity. The initial vehicle mass with no cargo was 12.5 g, which was sufficient to drive the vehicle in a straight line.

For the circular experiments in FIG. 11, 20 g of cargo had to be added to prevent the tires from slipping. As the cargo mass was increased from 20 g to 50 g, the velocity decreased from 7.5 to 5.5 mm/s.

We compared the MAS performance to other metal-air batteries using a Ragone plot (FIG. 11D), which shows the maximum power density versus maximum energy density of our MAS (circles), several commercial metal-air batteries (black squares, A312 and PP425 zinc-air batteries), and laboratory demonstrated metal-air batteries (circles).

A stationary PVA-MAS on aluminum delivered a maximum specific energy of 1299 Wh/$kg_{MAS}$ and maximum specific power of 217 W/$kg_{MAS}$. We normalized the energy and power of our MAS by the MAS weight (including the hydrogel, cathode, and current collector but not the metal anode or oxygen mass) as the MAS weight is the only mass that the electric motor needs to transport. The stationary energy and power densities were superior to other aluminum-air batteries.

The MAS energy density increased when it traversed along a metal surface as it extracted additional energy from the metal without increasing the MAS mass. To accommodate the consumed and lost water during travel, we added 0.8 g of 6M KOH electrolyte per 6 $cm^2$ of new metal surface area. The data points in FIG. 11D show the increased energy density of the MAS as it traversed a metal surface (following the arrow from left to right). The energy density includes the mass of the added electrolyte (Table 1, below). The power density includes just the mass of a single MAS. Each data point for the PVA and PAM MAS on aluminum corresponds to a traversed metal surface area x-times larger than a 6 $cm^2$ stationary MAS, where x is labeled below the data points. The added electrolyte mass normalized by the original MAS mass ($g_0$=1 gram) is shown above the data. The PVA-MAS on zinc surfaces had a similar performance enhancement over commercial and laboratory zinc-air batteries as the MAS on aluminum. Overall, with water addition, the MAS has 2.3× the energy density of metal-air batteries and 12.7× the energy density of lithium-ion batteries (243 Wh/kg).

TABLE 1

Data for the aluminum-MAS in FIG. 11D

| Total Area (Area/$A_0$) | Total water added (grams) | Max energy density (Wh/kg) | | Max power density (W/kg) | |
|---|---|---|---|---|---|
| | | PVA | PAM | PVA | PAM |
| 1 | 0 | 1299 | 1044 | 217 | 191 |
| 10 | 8 | 1800 | 1472 | 213 | 190 |
| 20 | 16 | 2122 | 1765 | 210 | 188 |
| 30 | 24 | 2370 | 2014 | 207 | 186 |
| 40 | 32 | 2570 | 2227 | 205 | 183 |
| 50 | 40 | 2747 | 2364 | 202 | 180 |
| 60 | 48 | 2857 | 2508 | 196 | 178 |
| 70 | 56 | 2960 | 2632 | 190 | 175 |
| 80 | 64 | 3022 | 2745 | 182 | 172 |
| 90 | 72 | 3097 | 2838 | 177 | 169 |

We characterized the hydrogel conductivity and surface morphology before and after discharging the MAS over 90× the initial MAS surface area, A/$A_0$=90, to understand how the hydrogels affected the mobile MAS performance. FIGS. 12A-12D show optical microscopy images of the PVA and PAM surfaces after discharging the MAS on aluminum over 90× the initial MAS area.

The aluminum oxidation products did not adhere to the PVA surface but did adhere to the PAM surface due to the low elastic modulus and high adhesion of PAM hydrogels. Without being bound to any particular theory, the PAM compliance, however, might make it more robust to continued use as it had superior performance retention than PVA (FIG. 11D).

FIGS. 12E and 12 F show the ionic conductivity of PVA and PAM hydrogels after the MAS was fully discharge on fresh aluminum surfaces with total area A/$A_0$=90. The initial PVA hydrogel electrolyte exhibited a first cycle ionic conductivity of 8.36×$10^{-2}$ S $cm^{-1}$ compared to 1.75×$10^{-2}$ S $cm^{-1}$ for PAM. During 90 cycles, the PAM ionic conductivity decreased 8.9%, but the PVA ionic conductivity decreased only 0.5%, showing that very little anode oxidation product remained in the hydrogel. The hydrogel, therefore, does not gain much mass due to reaction products, which is a benefit over conventional metal air batteries whose mass increases during discharge In summary, we show that hydrogel electrolytes with oxygen reduction cathodes can electrochemically scavenge large amounts of energy at high power from metal surfaces. The high performance of the metal-air scavenger can be utilized by robots for continuous inspection of metal surfaces, recharging using scrap metal, and by robots and electronics that operate on or near metal surfaces prolific in urban environments. Centimeter scale and smaller robots, vehicles, and electronics can benefit from the orders of magnitude more energy available using a metal-air scavenger compared to traditional micro energy storage technologies that scale poorly.

Experimental Methods

Preparation of PVA hydrogel: We dissolved 1 gram of commercial PVA powder in 20 mL of DI-water and stirred the solution for 6 hours at 95° C. Then, we added 3 mL of 6 M KOH aqueous into the PVA solution and continued stirring for 1 hour at 95° C. Finally, we poured the as-obtained solution into a mold and transfer the mold to an argon atmosphere oven at 60° C. for 6 hours and negative 1.0 bar, forming the PVA hydrogel electrolyte.

Preparation of PAM hydrogel: We mixed 10 grams of acrylamide monomer into 4.5 mL of DI water and stirred the solution for 30 minutes. We then added 0.5 mL of 20 mg/mL N, N'-methylenebis(acrylamide) and 5 mL of 5 mg/mL potassium persulfate into the above solution and stirred for 2 hours until fully dissolved. Next, we poured the solution into a petri dish, degassed the solution at negative 1.0 barr, and stored the degassed solution in argon atmosphere for 6 hours to obtain cross-linked PAM hydrogel. Finally, we saturated the PAM hydrogel by soaking it in 6 M KOH or 1M HCl solution for 24 h.

MAS assembly and materials: We used a commercial Pt/Carbon gas diffusion electrode (0.5 mg/$cm^2$ 60% platinum from FuelCellsEtc) as the cathode. We assembled the MAS by attaching the cathode to the hydrogel electrolyte surface in contact with the petri dish during electrolyte curing, which remained sticky after removing the petri dish. The MAS was electrically and mechanically connected to the electric vehicle using nickel wire. The electric vehicle was 3-D printed on an Objet30 PhotoPolymer Printer and the electric motor was purchased from Firgelli Automations. For experiments where the MAS-powered vehicle traveled in a circle, the beam and water reservoir were 3-D printed using Objet30 PhotoPolymer printer. The wicking paper was purchased from KIMTECH.

Electrochemical measurements: An SP-300 Bio-Logic electrochemistry workstation measured the discharge and polarization performance of MAS on 6061 aluminum, zinc (99% purity), and 316 stainless steel surfaces at room temperature. The reaction area was 2×3 cm$^2$. Gravimetric capacities and energy densities were normalized by the MAS mass.

EXEMPLARY EMBODIMENTS

The following embodiments are illustrative but not limiting of the present disclosure and the attached claims.

Embodiment 1. A power cell, comprising: an electrolyte, the electrolyte being characterized as being solid or semi-solid; and a cathode in electronic communication with the electrolyte, the cathode being configured to support reduction of oxygen from an environment exterior to the power cell; and an electrical load in electronic communication with the cathode, the power cell being (a) configured to reversibly place the electrolyte into stationary electronic communication with a metal exterior to the power cell, (b) configured to effect relative motion between the electrolyte and a metal exterior to the power cell.

Embodiment 2. The power cell of Embodiment 1, wherein the electrolyte comprises a hydroxide salt. Some example such salts include, e.g., potassium hydroxide (KOH), sodium hydroxide (NaOH), calcium hydroxide (Ca(OH)$_2$), zinc hydroxide, and barium hydroxide (Ba(OH)$_2$).

An electrolyte can also include a neutral salt, such as sodium chloride (NaCl) and potassium chloride (KCl). An electrolyte can also include an acid, e.g., hydrogen chloride (HCl), and sulfuric acid (H$_2$SO$_4$). An electrolyte can also include an ionic liquid, e.g., 1-ethyl-3-methyl-imidazolium-oligo-flouro-hydrogenate (EMIm-(HF)$_{2.3}$F). A variety of other materials can be electrolytes (or can themselves be electrolytes). An exemplary, non-limiting listing of such materials includes, e.g., acidic electrolytes (sulfuric acid, acetic acid, perchloric acid, hydrochloric acid, Nitric acid, nitrous acid, phosphoric acid). Additional electrolyte materials can be found at, e.g., Table III of Mainar, et al., Int. J. Energy Res. 2016, 40, 1032-1049, and include (without limitation) (NH$_4$)$_2$Cs, Al2O3, aluminate, amine based absorbents, (PZ, MEA, AEEA, and the like), ammonium compounds, bismuth soluble salts, Ca(OH)$_2$, citric acid, Cs$_2$CO$_3$, Cs$_3$C$_6$H$_5$O$_7$·2H$_2$O, CsCH$_3$CO$_2$, CsF, H$_3$PO$_4$, In (CH$_3$COO)$_2$, In$_2$(SO$_4$)$_3$, In$_3$(NO$_3$)$_2$, K(CH$_3$COO), K$_2$CO$_3$, K$_2$HBO$_3$, K$_2$HPO$_4$, K$_2$Sn(OH)$_6$, K$_3$AsO$_4$, K$_3$BO3, K3PO$_4$, KF, KOH—CH$_3$OH, LiOH, LiOH—Ca(OH)$_2$, Na$_2$CO$_3$, Na$_2$HBO$_3$, Na$_2$HPO$_4$, Na$_2$Sn(OH)$_6$, Na$_3$BO$_3$, Na$_3$PO$_4$, NaOH—Na$_2$SiO$_3$, Pb(CH$_3$COO)$_2$, PbO, SiO$_3^{2-}$, soda lime, stagnate, succinic acid, surfactants, tartaric acid, tin acetate, titanate, ZnO.

Ionic liquids can also be present in or as electrolytes, e.g., (1-methyl-1-propylpyrrolidinium chloride (Py13Cl) with various ratios of aluminum chloride (AlCl$_3$). Polymer electrolytes (e.g., polyethylene oxide, gelatin-polyacrylamide) are also suitable. Similarly, solid electrolytes can also be used. Example solid electrolytes include X$_2$(BO$_4$)$_3$ compounds, wherein X=Sc, Al, In, Lu, Yb, Tm, Er, and B=Mo, W). Solid electrolytes can also sodium (Na) superionic conductor (NASICON)-type materials, which can have the formula (Al$_x$Zr$_{1-x}$)4/(4x)Nb(PO$_4$)$_3$ for x≤0.2. An electrolyte can also include a NASICON, which can have the formula Na$_{1+x}$Zr$_2$Si$_x$P$_{3-x}$O$_{12}$, 0<x<3.

Embodiment 3. The power cell of any one of Embodiments 1-2, wherein the electrolyte is characterized as a hydrogel. In some embodiments, the hydrogel has an elastic modulus of between about 1 Pa and about 1 MPa, including all intermediate values and ranges. As an example, the hydrogel can have an elastic modulus of from about 1 Pa to about 1 MPa, from about 100 PA to about 0.5 MPa, from about 500 Pa to about 0.1 MPa, from about 700 to about 0.1 MPa.

Embodiment 4. The power cell of any one of Embodiments 1-3, wherein the cathode comprises a carbonaceous material.

Embodiment 5. The power cell of Embodiment 4, wherein the cathode comprises single-wall carbon nanotubes, multi-wall carbon nanotubes, single-layer graphene, multi-layer graphene, carbon black, or any combination thereof. It should be understood that a cathode can include a carbonaceous material as well as another material, e.g., a metal material, an alloy, and the like.

A cathode can also comprise, e.g.:
Noble metals and alloys, such as platinum (Pt), palladium (Pd), gold (Au) and silver (Ag), Pt-M alloy (M=nickel (Ni), cobalt (Co), iron (Fe) and palladium (Pd)).
A nonprecious metal and/or an oxide, e.g, manganese oxides (Mn$_3$O$_4$), cobalt oxides (Co$_3$O$_4$) and iron oxides (Fe$_3$O$_4$).
Metal-nitrogen-carbon compounds: (M-N—C, M=V (vanadium), Cr (chromium), Fe (iron), Co (cobalt), Ni (nickel)). It should be understood that the cathode of the disclosed technology can interact with ambient air, i.e., the environment exterior to the cathode.

Embodiment 6. The power cell of any one of Embodiments 1-5, wherein the cathode comprises an oxygen reduction catalyst.

Embodiment 7. The power cell of Embodiment 6, wherein the oxygen reduction catalyst is disposed on the cathode, disposed within the cathode, or both.

Embodiment 8. The power cell of any one of Embodiments 6-7, wherein the oxygen reduction catalyst comprises platinum.

Other suitable oxygen reduction catalysts include, for example:
Noble metals and alloys: platinum (Pt), palladium (Pd), gold (Au) and silver (Ag), Pt-M alloy (M=nickel (Ni), cobalt (Co), iron (Fe) and palladium (Pd)).
Nonprecious metal: manganese oxides (Mn$_3$O$_4$), cobalt oxides (Co$_3$O$_4$) and iron oxides (Fe$_3$O$_4$).
Metal-nitrogen-carbon: (M-N—C, M=V (vanadium), Cr (chromium), Fe (iron), Co (cobalt), Ni (nickel)).

Embodiment 9. The power cell of any one of Embodiments 1-8, further comprising an oxygen-permeable layer disposed so as to at least partially shield the cathode from the environment exterior to the power cell. The layer can be used to protect the cathode from physical contact with the environment exterior to the power cell, e.g., to protect against scratches, dents, or other physical damage. The oxygen-permeable layer can be permeable to oxygen in the bulk, but can also include one or more openings (e.g., pores, apertures) that allow for oxygen passage.

Embodiment 10. The power cell of Embodiment 9, wherein the oxygen-permeable layer is characterized as porous. The pores can be periodic or non-periodic. The pores can be circular, but can also be non-circular.

Embodiment 11. The power cell of any one of Embodiments 9-10, wherein the oxygen-permeable layer is characterized as omniphobic. Without being bound to any particular theory, an omniphobic oxygen-permeable layer provides some protection to the cathode and other components of the cell from exterior hazards, e.g., dirt, grease, oil, precipitation, and the like.

Embodiment 12. The power cell of Embodiment 11, wherein the oxygen-permeable layer is characterized as hydrophobic. Without being bound to any particular theory, an omniphobic oxygen-permeable layer can provide protection to the cathode and other components of the cell from exterior moisture and other moisture hazards.

Embodiment 13. The power cell of any one of Embodiments 9-12, wherein the oxygen-permeable layer is disposed so as to reduce evaporation from the electrolyte. Without being bound to any particular theory, reducing evaporation from the electrolyte can help to maintain the electrolyte's performance characteristics.

Embodiment 14. The power cell of any one of Embodiments 1-13, wherein the electrical load comprises a motor, an actuator, a sensor, a signal generator, or any combination thereof. Some example devices that can be powered by the disclosed cells include, without limitation, light sources (e.g., LEDs), computer chip, cameras, robots, vehicles, and the like. An electrical load can, of course, include two or more components, e.g., a motor and a sensor, such as can be found on a self-propelled device that includes one or more on-board sensors.

A power cell can be configured such that power evolved from the cell can be distributed to two or more loads at the same time or at different times, e.g., in a device wherein the power cell is connected to a vehicle and powers the vehicle until the vehicle reaches a certain location, at which time the power cell's power is diverted from powering the vehicle to powering a sensor, e.g., a sensor that is attached to the vehicle.

Embodiment 15. The power cell of Embodiment 14, wherein the motor is configured so as to effect relative motion between the electrolyte and the metal exterior to the power cell.

As an example, a motor or actuator can be configured to translate the power cell across a metal surface, e.g., the exterior of a cargo container, thereby providing the cathode of the power cell with access to "fresh" metal anode material as the power cell is translated across the exterior of the cargo container.

A motor or actuator can also be configured such that the power cell remains stationary while the motor effects motion of metal that is used as an anode by the power cell. As but one non-limiting example, a motor could be powered by a power cell to effect motion of a metal ribbon or other metal relative to the power cell, thus acting to "feed" fresh metal anode material to the power cell.

The motor or actuator can be configured to operate continuously, e.g., constantly advancing a metal anode material. The motor or actuator can also be configured to advance metal anode material step-wise to the cathode of the cell. This can be performed so as to advance unoxidized anode material to the power cell as needed, such that when operation of the power cell has oxidized a region of metal that underlies the cathode, the motor can be operated to advance unoxidized anode material to the power cell, e.g., by advancing a strip of metal against the cathode.

Embodiment 16. The power cell of any one of Embodiments 1-15, wherein the power cell comprises one or more of an adhesive, a magnet, a source of reduced pressure, or any combination thereof, one or more of which can be used to help in maintaining the position of the power cell. Elastic bands, mechanical clips, electromagnets, glues, weights, and electroadhesives can also be used. Because power cells according to the present disclosure can be comparatively small in size, a magnet can be sufficient to maintain the necessary contact between the device and the metal surface serving as the anode. A device can be maintained in position by action of gravity, as well.

Embodiment 17. The power cell of any one of Embodiments 1-16, wherein the electrolyte is in electronic communication with a metal surface exposed to the environment exterior to the power cell.

Embodiment 18. The power cell of any one of Embodiments 1-17, wherein the electrolyte is in physical communication with a metal surface exposed to the environment exterior to the power cell.

Embodiment 19. A method, comprising operating a power cell according to any one of Embodiments 1-18 so as to oxidize a metal exterior to the power cell and reduce oxygen from the environment exterior to the power cell (e.g., ambient air) so as to power the electrical load. As described elsewhere herein, the electrical load can comprise a motor, an actuator, a sensor, a light source, a signal source, and the like.

Embodiment 20. A method of powering an electrical load, comprising: with an electrical load in electronic communication with (i) a power cell that comprises an electrolyte and a cathode configured to support reduction of oxygen from an environment exterior to the power cell and (ii) a metal anode, the metal anode being a metal exterior to the power cell, effecting oxidation of the metal anode and reduction of environmental oxygen so as to power the electrical load.

Embodiment 21. The method of Embodiment 20, wherein the electrolyte remains stationary relative to the metal anode. As an example, the metal anode (e.g., in the form of a metal strip) can be advanced while the electrolyte remains stationary. A metal anode can be present in the form of a coil, which coil is unwound during cell operation. It should be understood that metal need not be present in the form of a strip, ribbon, or band, as metal can also be present as particulate, shavings, or in other form.

Embodiment 22. The method of Embodiment 20, further comprising effecting relative motion between the electrolyte and metal anode. As described elsewhere herein, the electrolyte can move, e.g., when the electrolyte is part of otherwise connected to a moving module that moves along a metal surface. The metal anode can move, e.g., when the metal anode is a coil that is uncoiled during operation of the device and then uncoiled metal is advanced relative to the electrolyte.

Embodiment 23. The method of Embodiment 22, wherein the relative motion is affected by the electrical load. This can be accomplished, e.g., when the electrical load is a motor that is powered by operation of the power cell, which motor moves the power cell along the surface of a metal. Alternatively (or in addition), the motor can advance the metal relative to the power cell.

Embodiment 24. The method of any one of Embodiments 22-23, wherein the power cell moves and the anode remains stationary.

Embodiment 25. The method of any one of Embodiments 22-23, wherein the anode moves and the power cell remains stationary.

Embodiment 26. The method of any one of Embodiments 20-25, wherein the electrical load comprises a motor, an actuator a sensor, a signal generator, or any combination thereof. Exemplary loads include, e.g., light sources (e.g., LEDs), computer chip, cameras, robots, vehicles, signal sources, and the like.

Embodiment 27. The method of any one of Embodiments 20-25, wherein the metal anode comprises a metal surface exposed to the ambient environment. The metal surface can be the surface of an existing useful object, e.g., a sign, a vehicle, a building, a mailbox, an industrial module (e.g., a distillation column, a storage tank, an antenna, a tower, and the like). Alternatively, the metal surface can be the surface of metal that is not in conventionally useful form, e.g., scrap metal and/or metal that is in powder or particulate form, or in other form that is not conventionally used in that other form.

Embodiment 28. The method of Embodiment 27, wherein the metal surface comprises a surface of a sign. Exemplary such signs include, e.g., traffic signs, billboards, marquees, and the like.

Embodiment 29. The method of Embodiment 28, wherein the metal surface comprises a surface of a vehicle. Such vehicles can be personal vehicles (e.g., cars, sports utility vehicles), mass transit vehicles (trains, subways, planes), space vehicles (rockets, satellites), and the like.

Embodiment 30. The method of any one of Embodiments 20-29, wherein the power cell is incorporated into a moveable entity motivated by powering the electrical load. Suitable such moveable entities are mentioned elsewhere, e.g., cars, trains, subways, and the like.

What is claimed:

1. A power cell, comprising:
   an electrolyte, the electrolyte being characterized as being solid or semi-solid; and
   a cathode in electronic communication with the electrolyte, the cathode being configured to support reduction of oxygen from an environment exterior to the power cell; and
   an electrical load in electronic communication with the cathode,
   the power cell being arranged such that the electrolyte is exposed to the environment exterior to the power cell, and
   the power cell being (a) configured to reversibly place the electrolyte into physical contact with a metal located in the environment exterior to the power cell and opposite the electrolyte, or (b) configured to effect relative motion between the electrolyte and a metal located in the environment exterior to the power cell and opposite the electrolyte.

2. The power cell of claim 1, wherein the electrolyte comprises a hydroxide salt.

3. The power cell of claim 1, wherein the electrolyte is characterized as a hydrogel.

4. The power cell of claim 1, wherein the cathode comprises a carbonaceous material, the carbonaceous material optionally comprising single-wall carbon nanotubes, multi-wall carbon nanotubes, single-layer graphene, multi-layer graphene, carbon black, or any combination thereof.

5. The power cell of claim 1, wherein the cathode comprises an oxygen reduction catalyst.

6. The power cell of claim 1, further comprising an oxygen-permeable layer disposed so as to at least partially shield the cathode from the environment exterior to the power cell, the oxygen-permeable layer optionally being characterized as porous.

7. The power cell of claim 6, wherein the oxygen-permeable layer is characterized as omniphobic.

8. The power cell of claim 6, wherein the oxygen-permeable layer is characterized as hydrophobic.

9. The power cell of claim 6, wherein the oxygen-permeable layer is disposed so as to reduce evaporation from the electrolyte.

10. The power cell of claim 1, wherein the electrical load comprises a motor, an actuator, a sensor, a signal generator, or any combination thereof.

11. The power cell of claim 10, wherein the motor is configured so as to effect motion by the electrolyte relative to the metal exterior to the power cell.

12. The power cell of claim 1, wherein the electrolyte is in electronic communication with a metal surface exposed to the environment exterior to the power cell.

13. The power cell of claim 1, wherein the electrolyte is in physical communication with a metal surface exposed to the environment exterior to the power cell.

14. A method, comprising operating a power cell according to claim 1 so as to oxidize the metal exterior to the power cell and reduce oxygen from the environment exterior to the power cell so as to power the electrical load.

15. A method of powering an electrical load, comprising:
    with an electrical load in electronic communication with
    (i) a power cell that comprises an electrolyte exposed to the environment exterior to the power cell, and the power cell being (a) configured to reversibly place the electrolyte into physical contact with a metal located in the environment exterior to the power cell and opposite the electrolyte, or (b) configured to effect relative motion between the electrolyte and a metal located in the environment exterior to the power cell and opposite the electrolyte and
    (ii) a metal anode, the metal anode being a metal exterior to the power cell,
    effecting oxidation of the metal anode and reduction of environmental oxygen so as to power the electrical load.

16. The method of claim 15, wherein the electrolyte remains stationary relative to the metal anode.

17. The method of claim 15, further comprising effecting relative motion between the electrolyte and the metal anode.

18. The method of claim 17, wherein the relative motion is effected by the electrical load.

19. The method of claim 17, wherein the power cell moves and the metal anode remains stationary.

20. The method of claim 17, wherein the metal anode moves and the power cell remains stationary.

21. The method of claim 15, wherein the metal anode comprises a metal surface exposed to the ambient environment.

22. The method of claim 15, wherein the power cell is incorporated into a moveable entity motivated by powering the electrical load.

* * * * *

UNITED STATES PATENT AND TRADEMARK OFFICE
CERTIFICATE OF CORRECTION

Page 1 of 2

PATENT NO. : 12,334,532 B2
APPLICATION NO. : 17/428996
DATED : June 17, 2025
INVENTOR(S) : James Henry Pikul et al.

It is certified that error appears in the above-identified patent and that said Letters Patent is hereby corrected as shown below:

On the Title Page

Under Column no. 1, Page 2, Item (56) Line no. 6, Replace:
""PP425Zinc"
With:
--"PP425 Zinc--

In the Specification

Under Column no. 1, Line no. 14, Replace:
"is foregoing"
With:
--foregoing--

Under Column no. 1, Line no. 15, Replace:
"purposes."
With:
--purposes.
GOVERNMENT RIGHTS
This invention was made with government support under N00014-19-1-2353 awarded by the Office of Naval Research. The government has certain rights in the invention.--

Under Column no. 2, Line no. 65, Replace:
"disclosure;"
With:
--disclosure.--

Signed and Sealed this
Fourth Day of November, 2025

John A. Squires
*Director of the United States Patent and Trademark Office*

CERTIFICATE OF CORRECTION (continued)
U.S. Pat. No. 12,334,532 B2

Under Column no. 5, Line no. 6, Replace:
"acutator,"
With:
--actuator,--

Under Column no. 10, Line no. 26, Replace:
"discharge"
With:
--discharge.--